(12) United States Patent
Hu et al.

(10) Patent No.: US 12,509,822 B2
(45) Date of Patent: Dec. 30, 2025

(54) EVAPORATIVE DEVICES HAVING DELIGNIFIED PLANT MATERIALS, AND SYSTEMS AND METHODS FOR FABRICATION AND USE THEREOF

(71) Applicant: UNIVERSITY OF MARYLAND, COLLEGE PARK, College Park, MD (US)

(72) Inventors: Liangbing Hu, Rockville, MD (US); Chaoji Chen, Sykesville, MD (US); Zhihan Li, College Park, MD (US); Jianguo Li, College Park, MD (US)

(73) Assignee: UNIVERSITY OF MARYLAND, COLLEGE PARK, College Park, MD (US)

( * ) Notice: Subject to any disclaimer, the term of this patent is extended or adjusted under 35 U.S.C. 154(b) by 517 days.

(21) Appl. No.: 17/919,179

(22) PCT Filed: Apr. 21, 2021

(86) PCT No.: PCT/US2021/028318
§ 371 (c)(1),
(2) Date: Oct. 14, 2022

(87) PCT Pub. No.: WO2021/216651
PCT Pub. Date: Oct. 28, 2021

(65) Prior Publication Data
US 2023/0203311 A1    Jun. 29, 2023

Related U.S. Application Data

(60) Provisional application No. 63/065,994, filed on Aug. 14, 2020, provisional application No. 63/013,401, filed on Apr. 21, 2020.

(51) Int. Cl.
*D21C 3/26* (2006.01)
*C04B 18/24* (2006.01)
(Continued)

(52) U.S. Cl.
CPC .............. *D21C 3/26* (2013.01); *C04B 18/248* (2013.01); *C08J 5/245* (2021.05); *C08J 5/248* (2021.05);
(Continued)

(58) Field of Classification Search
CPC ... A61L 9/04; A61L 9/12; A61L 9/122; A61L 9/127; C08J 5/245; C08J 5/248;
(Continued)

(56) References Cited

U.S. PATENT DOCUMENTS 2,123,409 A    7/1938   Armin
3,104,210 A    9/1963   Mount
(Continued)

FOREIGN PATENT DOCUMENTS

CA    1066697 A    11/1979
CN    105002232 A   10/2015
(Continued)

OTHER PUBLICATIONS

International Search Report and Written Opinion, mailed Sep. 9, 2021, in International Application No. PCT/US21/28318. (14 pages).
(Continued)

*Primary Examiner* — Timothy C Cleveland
(74) *Attorney, Agent, or Firm* — Rowan Tree Law Group, PLLC; Frederick F. Rosenberger

(57) ABSTRACT

An evaporative device has a piece of at least partially-delignified plant material. The at least partially-delignified plant material has a modified microstructure including a plurality of vessels, a plurality of fibers, and a plurality of engineered micropores. Each vessel can define a first lumen having a maximum cross-sectional dimension of at least 100 μm. Each fiber can define a second lumen having a maximum cross-sectional dimension less than or equal to 20 μm. The engineered micropores can extend through walls of the
(Continued)

vessels or fibers so as to fluidically interconnect the first and second lumina. In some embodiments, the plant material is reed or bamboo.

20 Claims, 12 Drawing Sheets

(51) Int. Cl.
| | |
|---|---|
| C08J 5/24 | (2006.01) |
| C08L 29/04 | (2006.01) |
| C08L 97/02 | (2006.01) |
| D21C 3/00 | (2006.01) |
| D21C 3/02 | (2006.01) |

(52) U.S. Cl.
CPC .............. *C08L 29/04* (2013.01); *C08L 97/02* (2013.01); *D21C 3/003* (2013.01); *D21C 3/006* (2013.01); *D21C 3/022* (2013.01); *C08J 2363/00* (2013.01); *C08J 2401/02* (2013.01); *C08L 2205/16* (2013.01)

(58) Field of Classification Search
CPC . C08J 2363/00; C08J 2401/02; C04B 18/248; C08L 29/04; C08L 97/02; C08L 2205/16; D21C 3/003; D21C 3/006; D21C 3/022; D21C 3/26; B01D 1/00; D21H 11/12; D21H 15/00

See application file for complete search history.

(56) References Cited

U.S. PATENT DOCUMENTS

| | | | |
|---|---|---|---|
| 3,159,554 | A | 12/1964 | Mount |
| 4,858,399 | A | 8/1989 | Salato, Jr. |
| 4,908,099 | A | 3/1990 | DeLong |
| 4,992,308 | A | 2/1991 | Sunol |
| 5,188,707 | A | 2/1993 | Gordy |
| 5,529,663 | A | 6/1996 | Springer |
| 5,632,123 | A | 5/1997 | Erwin |
| 5,686,146 | A | 11/1997 | Nozoki |
| 5,852,880 | A | 12/1998 | Harrison |
| 7,008,515 | B1 | 3/2006 | Husson, Jr. et al. |
| 8,349,131 | B1 | 1/2013 | Agarwal et al. |
| 8,540,168 | B2 | 9/2013 | Bennett et al. |
| 9,138,965 | B2 | 9/2015 | Hu et al. |
| 9,174,355 | B2 | 11/2015 | Rector et al. |
| 11,130,256 | B2 | 9/2021 | Hu et al. |
| 11,440,214 | B2 | 9/2022 | Hu et al. |
| 11,554,514 | B2 | 1/2023 | Hu et al. |
| 11,958,209 | B2 | 4/2024 | Hu et al. |
| 12,168,727 | B2 | 12/2024 | Hu et al. |
| 2004/0241302 | A1 | 12/2004 | Matsuo et al. |
| 2005/0008530 | A1 | 1/2005 | Caserta et al. |
| 2007/0029246 | A1 | 2/2007 | Ueda |
| 2007/0257130 | A1 | 11/2007 | Butler et al. |
| 2008/0146701 | A1 | 6/2008 | Sain et al. |
| 2008/0186801 | A1 | 8/2008 | Liu et al. |
| 2010/0147969 | A1 | 6/2010 | Bennett et al. |
| 2015/0232703 | A1 | 8/2015 | Nelson et al. |
| 2016/0092661 | A1 | 3/2016 | Hollingshead et al. |
| 2016/0272502 | A1 | 9/2016 | Zhu et al. |
| 2017/0043497 | A1 | 2/2017 | Burgert et al. |
| 2018/0043278 | A1 | 2/2018 | Singamaneni |
| 2018/0264414 | A1 | 9/2018 | Hu et al. |
| 2018/0342702 | A1 | 11/2018 | Hu et al. |
| 2018/0356127 | A1 | 12/2018 | Hu et al. |
| 2018/0370071 | A1 | 12/2018 | Boitouzet et al. |
| 2019/0282253 | A1 | 9/2019 | Steger |
| 2020/0109877 | A1 | 4/2020 | Chen et al. |
| 2020/0223091 | A1 | 7/2020 | Hu et al. |
| 2020/0233091 | A1 | 7/2020 | Fink et al. |
| 2020/0238565 | A1* | 7/2020 | Hu .......................... B32B 21/13 |
| 2020/0282591 | A1 | 9/2020 | Hu et al. |
| 2021/0088252 | A1 | 3/2021 | Hu et al. |
| 2021/0122902 | A1 | 4/2021 | Hu et al. |
| 2022/0193296 | A1 | 6/2022 | Dunbar et al. |
| 2022/0412002 | A1 | 12/2022 | Hu et al. |
| 2023/0160141 | A1 | 5/2023 | Hu et al. |
| 2023/0203311 | A1 | 6/2023 | Hu et al. |
| 2023/0234258 | A1 | 7/2023 | Hu et al. |
| 2023/0256645 | A1 | 8/2023 | Hu et al. |
| 2023/0340728 | A1 | 10/2023 | Hu et al. |

FOREIGN PATENT DOCUMENTS

| | | |
|---|---|---|
| EP | 1809825 A1 | 7/2007 |
| IN | 2018/17022033 A | 10/2018 |
| JP | 2004-330141 A | 11/2004 |
| JP | 2015-077740 A | 4/2015 |
| WO | WO 1991/001409 A1 | 2/1991 |
| WO | 2005/076770 A2 | 8/2005 |
| WO | WO 2005/108299 A1 | 11/2005 |
| WO | 2011/120073 A1 | 10/2011 |
| WO | WO 2016/141432 A1 | 9/2016 |
| WO | WO 2017/136714 A1 | 8/2017 |
| WO | WO 2018/187238 A1 | 10/2018 |
| WO | WO 2018/191181 A1 | 10/2018 |
| WO | WO 2019/055789 A1 | 3/2019 |
| WO | WO 2019/138588 A1 | 7/2019 |
| WO | 2021/110770 A1 | 6/2021 |

OTHER PUBLICATIONS

"Capillary Action and Water," USGS, last accessed Apr. 18, 2022, available online at: https://www.usgs.gov/special-topic/water-science-school/science/capillary-action-and-water?qt-science_center_objects=0#qt-science_center_objects . (7 pages).

"PITS: Ultra-structure, classification & functions: Simple & Bordered Pits (Similarities and Differences)," *Easybiologyclass.com*, last accessed Apr. 18, 2022. Available online at: https ://www.easybiologyclass.com/pits-ultra-structure-classification-functions-simple-bordered-pits-similiarities-differences/ . (4 pages).

Abstract for Lee et al., "Nanostructure and surface composition of Pt and Ru binary catalysts on polyaniline-functionalized carbon nanotubes," *Langmuir*, Oct. 2011, 27(23): pp. 14654-14661. (2 pages).

Abstract for Yano et al., "High Strength Wood-based Materials," *Cellulose Commun.*, 2003, 10(1): pp. 23-27. (6 pages).

Ali et al., "The structure and mechanics of nanofibrillar cellulose foams," *Soft Matter*, 2013, 9: pp. 1580-1588. (9 pages).

Blanchette et al., "Changes in structural and chemical components of wood delignified by fungi," *Wood Sci. Technol.*, 1985, 19: pp. 35-46. (12 pages).

Burgert et al., "Bio-inspired functional wood-based materials—hybrids and replicates," International Materials Reviews, 2015, 60(8): pp. 431-450. (21 pages).

Chen et al., "All-wood, low tortuosity, aqueous, biodegradable supercapacitors with ultra-high capacitance," *Energy & Environmental Science*, 2017, 10: pp. 538-545. (8 pages).

Chen et al., "Highly flexible and efficient solar steam generation device," *Advanced Materials*, 2017, 29(30): 1701756. (8 pages).

Chen et al., "Scalable and Sustainable Approach toward Highly Compressible, Anisotropic, Lamellar Carbon Sponge," *Chem*, 2018, 4: pp. 544-554. (12 pages).

Chen et al., "Thermal behavior of extracted and delignified pine wood flour," *Thermochimica Acta*, 2014, 591: pp. 40-44. (5 pages).

Deville et al., "Freezing as a Path to Build Complex Composites," *Science*, 2006, 311 (5760): pp. 515-518. (6 pages).

Dutkova et al., "Mechanochemically synthesized $CuFeSe_2$ nanoparticles and their properties," *Acta Physica Polonica A*, Apr. 2017, 131(4): pp. 1156-1158. (3 pages).

EP Office Action, issued Feb. 26, 2024 (Feb. 26, 2024), in European Patent Application No. 21792209.5. (7 pages).

EP Office Action, issued Nov. 26, 2024 (Nov. 26, 2024), in European Patent Application No. 21792209.5. (6 pages).

(56) References Cited

OTHER PUBLICATIONS

Fu et al., "Nanostructured Wood Hybrids for Fire-Retardancy Prepared by Clay Impregnation into the Cell Wall," *Applied Materials & Interfaces*, 2017, 9: pp. 36154-36163. (10 pages).
Ghosh, S.C., "Wood modification with functionalized polydimethylsiloxanes," Dissertation, University of Gottingen, 2009, pp. 1-15. (16 pages).
Goncalves et al., "The effect of carbonization on wood structure of Dalbergia Violacea, Stryphnodendron Polyphyllum, Tapirira Guianensis, Vochysia Tucanorum, and Pouteria Torta from the Brazilian Cerrado," *IAWA Journal, International Association of Wood Anatomist*, Jan. 2012, 33(1): pp. 73-90. (18 pages).
Guan et al., "Highly Compressible Wood Sponges with a Spring-like Lamellar Structure as Effective and Reusable Oil Absorbents," *ACS Nano*, 2018, 12: pp. 10365-10373. (9 pages).
Guo et al., "Anisotropic thermal transport in highly ordered $TiO_2$ nanotube arrays," *Journal of Applied Physics*, 2009, 106: 123526. (7 pages).
He et al., "An Energy-Efficient, Wood-Derived Structural Material Enabled by Pore Structure Engineering towards Building Efficiency," *Small Methods*, 2020, 4:1900747. (8 pages).
Ilyas et al., "Effect of Delignification on the Physical, Thermal, Chemical, and Structural Properties of Sugar Palm Fibre," *BioResources*, 2017, 12(4): 8734-54. (21 pages).
Jia et al., "Anisotropic, Mesoporous Microfluidic Frameworks with Scalable, Aligned Cellulose Nanofibers," *ACS Applied Materials & Interfaces*, 2018, 10: pp. 7362-7370. (9 pages).
Jia et al., "Scalable, anisotropic transparent paper directly from wood for light management in solar cells," *Nano Energy*, 2016, 36: pp. 366-373.
Jiang et al., "Bilayered biofoam for highly efficient solar steam generation," *Advanced Materials*, 2016, 28: pp. 9400-9407. (8 pages).
Lee et al., "Wearable textile battery rechargeable by solar energy," *Nano Letters*, Oct. 2013, 13(11): pp. 5753-5761. (9 pages).
Li et al., "A radiative cooling structural material," *Science*, 2019, 364: pp. 760-763. (5 pages).
Li et al., "Anisotropic, lightweight, strong, and super thermally insulating nanowood with naturally aligned nanocellulose," *Sci. Adv.*, 2018, 4: eaar3724. (10 pages).
Li et al., "Lignin-Retaining Transparent Wood," *ChemSusChem*, 2017, 10: pp. 3445-3451. (7 pages).
Li et al., "Luminescent Transparent Wood," *Advanced Optical Materials*, 2016, 5:1600834. (5 pages).
Li et al., "Optically Transparent Wood from a Nanoporous Cellulosic Template: Combining Functional and Structural Performance," *Biomacromolecules*, 2016, 17: pp. 1358-1364. (7 pages).
Li et al., "Strong and superhydrophobic wood with aligned cellulose nanofibers as a waterproof structural material," *Chinese Journal of Chemistry*, 2020, 38(8): pp. 823-829. (7 pages).
Li et al., "Towards centimeter thick transparent wood through interface manipulation," *Journal of Materials Chemistry A*, 2018, 6: 1094-1101. (8 pages).
Li et al., "Wood Composite as an Energy Efficient Building Material: Guided Sunlight Transmittance and Effective Thermal Insulation," *Advanced Energy Materials*, 2016, 6: 1601122. (7 pages).
Li et al., "Wood-Polymer Composites Prepared by the In Situ Polymerization of Monomers Within Wood," *Journal of Applied Polymer Science*, 2011, 119: pp. 3207-3216. (10 pages).
Liu et al. "Wood-graphene oxide composite for highly efficient solar steam generation and desalination," *ACS Applied Materials & Interfaces*, Feb. 2017, 9: pp. 7675-7681. (7 pages).
Liu et al., "A bioinspired, reusable, paper-based system for high-performance large-scale evaporation," *Advanced Materials*, 2015, 27: pp. 2768-2774. (7 pages).
Lv et al., "Eco-friendly wood-based solid-state flexible supercapacitors from wood transverse section slice and reduced graphene oxide," *Electronic Materials Letters*, Jul. 2015, 11(4): pp. 633-642. (10 pages).
Lv et al., "Novel wood-based all-solid-state flexible supercapacitors fabricated with a natural porous wood slice and polypyrrole," *RSC Adv.*, 2015, 5: pp. 2813-2818. (6 pages).
Okahisa et al., "Optically transparent wood-cellulose nanocomposite as a base substrate for flexible organic light-emitting diode displays," *Composites Science and Technology*, 2009 (available online May 3, 2009), 69: pp. 1958-1961. (4 pages).
Rekola, J., "Wood as a Model Material for Medical Biomaterials," Dissertation, Institute of Dentistry, Biomaterials Science and Department of Otorhinolaryngology and Head and Neck Surgery, University of Turku, Turku, Finland, 2011. (94 pages).
Rowell, Roger M., "Chemical Modification of Wood," *Commonwealth Forestry Bureau—Forest Product Abstracts*, Dec. 1983, 6(12): pp. 363-382. (20 pages).
Saldivia, Manuel Alejandro Gonzalez, "Two-Stage O2 Delignification System Cuts Mill's Chemical Use, Boosts Pulp Quality," *PaperAge*, Jan./Feb. 2003, pp. 18-24. (5 pages).
Shams et al., "Compressive deformation of wood impregnated with low molecular weight phenol formaldehyde (PF) resin III: Effects of sodium chlorite treatment," *Journal of Wood Science*, 2005, 51(3): pp. 234-238. (5 pages).
Solar et al., "Alkaline and alkaline/oxidation pre-treatments of spruce wood. Part 1: Chemical alterations of wood and its digestibility under conditions of Kraft cook," *Wood Research*, 2009, 54(4): pp. 1-12. (12 pages).
Song et al., "Highly Compressible, Anisotropic Aerogel with Aligned Cellulose Nanofibers," *ACS Nano*, 2018, 12: pp. 140-147. (8 pages).
Song et al., "Processing bulk natural wood into a high-performance structural material," *Nature*, Feb. 2018, 554: pp. 224-228 (16 pages including supplementary information).
Tampieri et al., "From wood to bone: multi-step process to convert wood hierarchical structures into biomimetic hydroxyapatite scaffolds for bone tissue engineering," *Journal of Materials Chemistry*, Jun. 2009, 19(28): pp. 4973-4980. (8 pages).
White, R. H., "Effect of lignin content and extractives on the higher heating value of wood," *Wood Fiber Sci.*, Oct. 1987, 19(4): pp. 446-452. (7 pages).
Xue et al., "Robust and Low-Cost Flame-Treated Wood for High-Performance Solar Steam Generation," *ACS Applied Materials and Interfaces*, Apr. 2017, 9(17), pp. 15052-15057. (6 pages).
Yang et al., "Composite phase change materials with good reversible thermochromic ability in delignified wood substrate for thermal energy storage," *Applied Energy*, 2018, 212: pp. 455-464. (10 pages).
Yang et al., "Functionalized graphene enables highly efficient solar thermal steam generation," *ACS Nano*, 2017, 11(6): pp. 5510-5518. (9 pages).
Yano et al., "Effects of the removal of matrix substances as a pretreatment in the production of high strength resin impregnated wood based materials," *Journal of Materials Science Letters*, 2001, 20: pp. 1125-1126. (2 pages).
Yu et al., "Transparent wood containing $Cs_xWO_3$ nanoparticles for heat-shielding window applications," *Journal of Materials Chemistry A*, 2017, 5: pp. 6019-6024. (6 pages).
Zarrinmehr et al., "Interlocked archimedean spirals for conversion of planar rigid panels into locally flexible panels with stiffness control," *Computers & Graphics*, 2017, 66: pp. 93-102. (10 pages).
Zhang et al., "High-capacity, low-tortuosity, and channel-guided lithium metal anode," *Proceedings of the National Academy of Sciences*, Mar. 2017, 114(14): pp. 3584-59. (6 pages).
Zhu et al., "Anisotropic, transparent films with aligned cellulose nanofibers," *Advanced Materials*, 2017, 29: 1606284 (8 pages).
Zhu et al., "Highly Anisotropic, Highly Transparent Wood Composites," *Advanced Materials*, 2016, 28: pp. 5181-5157. (7 pages).
Zhu et al., "Integrated production of nano-fibrillated cellulose and cellulosic biofuel (ethanol) by enzymatic fractionation of wood fibers," *Green Chemistry*, 2011, 13: pp. 1339-1344. (6 pages).
Zhu et al., "Transparent and haze wood composites for highly efficient broadband light management in solar cells," *Nano Energy*, 2016, 26: pp. 332-339. (8 pages).
Zhu et al., "Wood-Derived Materials for Green Electronics, Biological Devices, and Energy Applications," *Chemical Reviews*, 2016, 116: pp. 9305-9374. (70 pages).

(56) References Cited

OTHER PUBLICATIONS

Zhang et al., "Influence of Hemicellulose Extraction on Water Uptake Behavior of Wood Strands," *Wood and Fiber Science*, Jul. 2011, 43(3): pp. 244-250. (7 pages).

* cited by examiner

EVAPORATIVE DEVICES HAVING DELIGNIFIED PLANT MATERIALS, AND SYSTEMS AND METHODS FOR FABRICATION AND USE THEREOF

CROSS-REFERENCE TO RELATED APPLICATION

The present application claims the benefit of U.S. Provisional Application No. 63/013,401, filed Apr. 21, 2020, entitled "Strong, Delignified Fibers, Methods of Making and Using the Same," and U.S. Provisional Application No. 63/065,994, filed Aug. 14, 2020, entitled "Decoupled Fluidic Transport Materials and Methods of Preparing the Same," each of which is incorporated by reference herein in its entirety.

FIELD

The present disclosure relates generally to processing of naturally-occurring cellulose-based materials, and more particularly, to forming and use of plant materials to make evaporative devices and systems.

SUMMARY

Embodiments of the disclosed subject matter provide evaporative devices formed by at least partial delignification of a natural plant material. The natural plant material can have a hierarchical cellular structure with macro-sized vessels and micro-sized fibers. For example, the natural plant material can be reed, bamboo, or another grass species. The removal of lignin from the natural plant material can enlarge diameters of channels or lumina of the cells and can open more pits or pores to fluidically interconnect the channels. With this modified hierarchically porous structure, fast fluidic transport can occur mainly through the microscale channels and nanoscale channels via capillary effects. The interconnecting pits and pores enable lateral transport into the macroscale channels, which have a relatively higher surface area that promotes efficient evaporation. Accordingly, in some embodiments, the evaporative devices can decouple fluidic transport and evaporation pathways.

In some embodiments, evaporative devices can achieve greater fluidic transport velocities and evaporation rates than the original natural plant material. For example, an evaporative device formed from delignified reed can demonstrate a fluid transport velocity of 14.7 mm/s and an evaporation rate of 46.9 kg/($m^2 \cdot h$), which are 160-times and 7-times faster, respectively, than the fluid transport velocity and evaporation rate achieved with natural reed. Embodiments of the disclosed subject matter can be employed in a wide range of applications, such as, but not limited to, fragrance distribution (e.g., diffuser), air sterilization, humidification, water purification, and distillation.

Any of the various innovations of this disclosure can be used in combination or separately. This summary is provided to introduce a selection of concepts in a simplified form that are further described below in the detailed description. This summary is not intended to identify key features or essential features of the claimed subject matter, nor is it intended to be used to limit the scope of the claimed subject matter. The foregoing and other objects, features, and advantages of the disclosed technology will become more apparent from the following detailed description, which proceeds with reference to the accompanying figures.

BRIEF DESCRIPTION OF THE DRAWINGS

Embodiments will hereinafter be described with reference to the accompanying drawings, which have not necessarily been drawn to scale. Where applicable, some elements may be simplified or otherwise not illustrated in order to assist in the illustration and description of underlying features. Throughout the figures, like reference numerals denote like elements.

DETAILED DESCRIPTION

General Considerations

Figure 1:
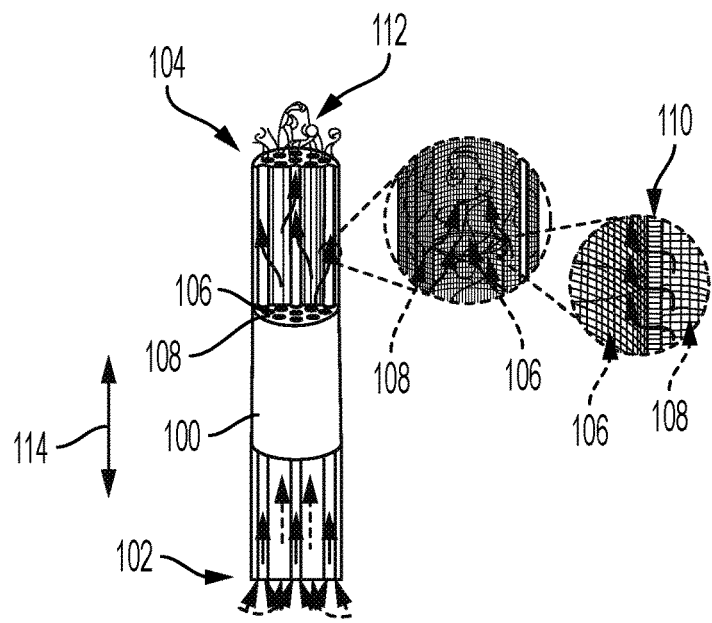
FIG. 1 is a simplified diagram illustrating operation of a delignified reed as an exemplary evaporative device, according to one or more embodiments of the disclosed subject matter.

For purposes of this description, certain aspects, advantages, and novel features of the embodiments of this disclosure are described herein. The disclosed methods and systems should not be construed as being limiting in any way. Instead, the present disclosure is directed toward all novel and nonobvious features and aspects of the various disclosed embodiments, alone and in various combinations and subcombinations with one another. The methods and systems are not limited to any specific aspect or feature or combination thereof, nor do the disclosed embodiments require that any one or more specific advantages be present, or problems be solved. The technologies from any embodiment or example can be combined with the technologies described in any one or more of the other embodiments or examples. In view of the many possible embodiments to which the principles of the disclosed technology may be applied, it should be recognized that the illustrated embodiments are exemplary only and should not be taken as limiting the scope of the disclosed technology.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "provide" or "achieve" to describe the disclosed methods. These terms are high-level abstractions of the actual operations that are performed. The actual operations that correspond to these terms may vary depending on the particular implementation and are readily discernible by one of ordinary skill in the art.

The disclosure of numerical ranges should be understood as referring to each discrete point within the range, inclusive of endpoints, unless otherwise noted. Unless otherwise indicated, all numbers expressing quantities of components, molecular weights, percentages, temperatures, times, and so forth, as used in the specification or claims are to be understood as being modified by the term "about." Accordingly, unless otherwise implicitly or explicitly indicated, or unless the context is properly understood by a person of ordinary skill in the art to have a more definitive construction, the numerical parameters set forth are approximations that may depend on the desired properties sought and/or limits of detection under standard test conditions/methods, as known to those of ordinary skill in the art. When directly and explicitly distinguishing embodiments from discussed prior art, the embodiment numbers are not approximates unless the word "about" is recited. Whenever "substantially," "approximately," "about," or similar language is explicitly used in combination with a specific value, variations up to and including 10% of that value are intended, unless explicitly stated otherwise.

Directions and other relative references may be used to facilitate discussion of the drawings and principles herein, but are not intended to be limiting. For example, certain terms may be used such as "inner," "outer," "upper," "lower," "top," "bottom," "interior," "exterior," "left," "right," "front," "back," "rear," and the like. Such terms are used, where applicable, to provide some clarity of description when dealing with relative relationships, particularly with respect to the illustrated embodiments. Such terms are not, however, intended to imply absolute relationships, positions, and/or orientations. For example, with respect to an object, an "upper" part can become a "lower" part simply by turning the object over. Nevertheless, it is still the same part and the object remains the same.

As used herein, "comprising" means "including," and the singular forms "a" or "an" or "the" include plural references unless the context clearly dictates otherwise. The term "or" refers to a single element of stated alternative elements or a combination of two or more elements, unless the context clearly indicates otherwise.

Although there are alternatives for various components, parameters, operating conditions, etc. set forth herein, that does not mean that those alternatives are necessarily equivalent and/or perform equally well. Nor does it mean that the alternatives are listed in a preferred order, unless stated otherwise. Unless stated otherwise, any of the groups defined below can be substituted or unsubstituted.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Features of the presently disclosed subject matter will be apparent from the following detailed description and the appended claims.

Overview of Terms

The following explanations of specific terms and abbreviations are provided to facilitate the description of various aspects of the disclosed subject matter and to guide those of ordinary skill in the art in the practice of the disclosed subject matter.

Longitudinal growth direction: A direction along which a plant grows from its roots or from a trunk thereof, with cellulose nanofibers forming cell walls of the plant being generally aligned with the longitudinal growth direction. In some cases, the longitudinal growth direction may be generally vertical or correspond to a direction of its water transpiration stream. This is in contrast to the radial growth direction, which extends from a center portion of the plant outward and may be generally horizontal.

Natural plant material: A portion (e.g., a mechanically cut portion) of any photosynthetic eukaryote of the kingdom Plantae in its native state as grown. In some embodiments, the natural plant material is a section from a species of natural grass, such as reed or bamboo. In other embodiments, the natural plant material is a section from any type of fibrous plant that has a naturally-formed (e.g., as grown) combination of macro-sized and micro-size lumina.

Delignification: The removal of some (e.g., at least 10%) or substantially all (e.g., at least 90%) of naturally-occurring lignin from the natural plant material. In some embodiments, at least 50% of the naturally-occurring lignin is removed in the delignification process. Lignin content within the plant material before and after delignification can be assessed using known techniques in the art, for example, Laboratory Analytical Procedure (LAP) TP-510-42618 for "Determination of Structural Carbohydrates and Lignin in Biomass," Version 08-03-2012, published by National Renewable Energy Laboratory (NREL), and ASTM E1758-01(2020) for "Standard Test Method for Determination of Carbohydrates in Biomass by High Performance Liquid Chromatography," published by ASTM International, both of which are incorporated herein by reference.

Reed: Any of common reed (*Phragmites australis*), giant reed (*Arundo donax*), Burma reed (*Neyraudia reynaudiana*), reed canary-grass (*Phalaris arundinacea*), reed sweet-grass (*Glyceria maxima*), small-reed (*Calamagrostis* species), paper reed (*Cyperus papyrus*), bur-reed (*Sparganium* species), reed-mace (*Typha* species), cape thatching reed (*Elegia tectorum*), and thatching reed (*Thamnochortus insignis*).

Bamboo: Any of Bambusoideae, such as but not limited to Moso, *Phyllostachys vivax, Phyllostachys viridis, Phyllostachys bambusoides*, and *Phyllostachys nigra*.

Introduction

A high-performance and pump-free evaporative device can be formed by at least partial delignification of a natural plant material. The natural plant material can have a hierarchical cellular structure with macro-sized vessels and micro-sized fibers. Each macro-sized vessel can extend parallel to a longitudinal growth direction of the plant material and can have a maximum cross-sectional dimension (e.g., diameter) in a plane perpendicular to the longitudinal growth direction that is at least 100 µm, for example, 200-400 µm. Each micro-sized fiber can also extend parallel to the longitudinal growth direction of the plant material and can have a maximum cross-sectional dimension (e.g., diameter) in the plane perpendicular to the longitudinal growth direction that less than or equal to 20 µm, for example, 10-20 µm. For example, the natural plant material can be reed, bamboo, or another grass species.

The removal of lignin from the natural plant material can enlarge diameters of lumina (also referred to herein as channels) of the cells. The removal of lignin can also open pits, micropores, and/or nanopores within the cell walls that were naturally narrowed or closed off. These engineered pores resulting from delignification can fluidically interconnect the lumina. With this modified hierarchically porous structure, fast fluidic transport can occur mainly through the microscale channels and nanoscale channels via capillary effects. At the same time, the engineered pores enable lateral transport into the macroscale channels, which have a relatively higher surface area that promotes efficient evaporation.

As a result, evaporative devices can achieve greater fluidic transport velocities and evaporation rates than the original natural plant material. Embodiments of the disclosed subject matter can be employed in a wide range of applications, such as, but not limited to, fragrance distribution (e.g., diffuser), air sterilization, humidification, water purification, and distillation.

Reed Implementations

FIG. 1 shows an exemplary configuration for an evaporative device employing a reed 100 that has undergone at least partial delignification. The delignified reed 100 exhibits a hierarchical, three-dimensional porous structure of macrochannels 106 and microchannels in an adjacent interstitial region 108 between macrochannels 106. The macrochannels 106 and the microchannels are both aligned and extend substantially parallel to a longitudinal growth direction 114 of the reed. The macrochannels 106 and the microchannels are interconnected with engineered pores within cell wall region 110.

This unique, highly porous structure enables decoupling of the transport of fluid by the reed 100 from evaporation of fluid by the reed 100. For example, when end portion 102 of the reed 100 is immersed in, or otherwise placed in fluid communication with, a body of fluid or fluids to be evaporated, the microchannels 118 of the delignified reed exhibit a significant capillary effect, which is beneficial for drawing fluid from the body of fluid upward into the reed stem. Meanwhile, the engineered pores in cell walls 110 provide lateral pathways that effectively transfer the fluid from the microchannels 118 in interstitial region 108 to the adjacent macrochannels 106. The size of the macrochannels 106 exhibit much less of a capillary effect and thus draw less water directly from the body of fluid. Rather, the macrochannels 106 provide more evaporation surface area (e.g., by exposing more inner surface area for fluidic evaporation), thereby enabling continuous and spontaneous evaporation within the macrochannels 106. End portion 104, which is opposite to end portion 102 along the longitudinal growth direction 114, is exposed such that evaporation 112 of fluid can be released from the exposed end portion 104 into the surrounding environment.

Figure 2A:
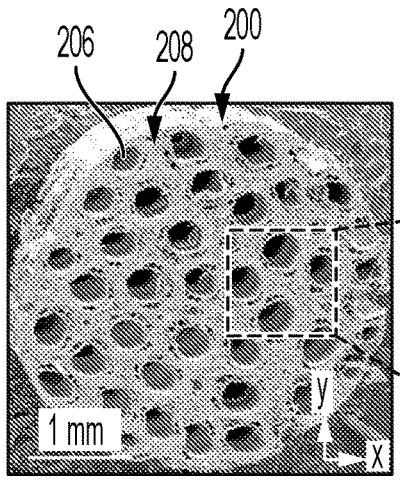
FIG. 2A is a scanning electron microscope (SEM) image of a transverse section of a piece of natural reed.
Figure 2B:
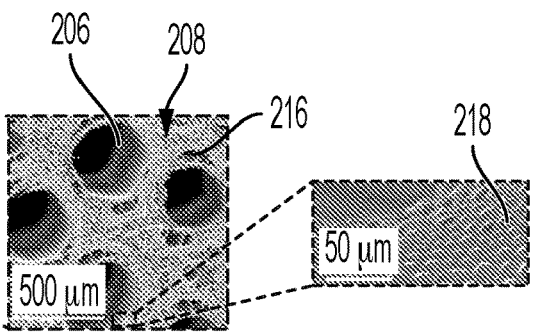
FIG. 2B is close-up SEM image of the highlighted portion of FIG. 2A showing various native macrochannels of the natural reed.
Figure 2C:
FIG. 2C is a close-up SEM image of the highlighted portion of FIG. 2B showing various microchannels of the natural reed.
Figure 4A:
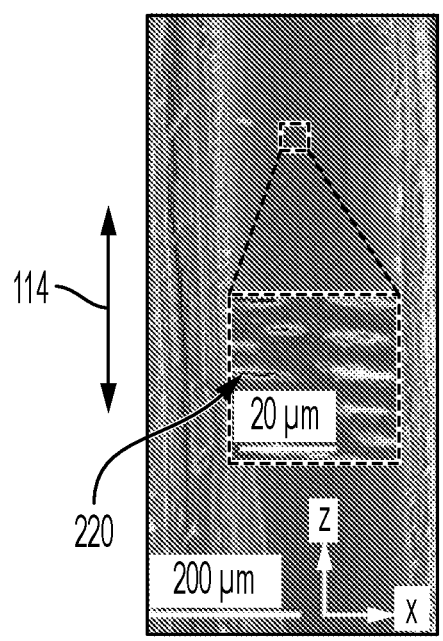
FIGS. 4A-4B are SEM images of a longitudinal cross-section showing lateral surfaces of the macrochannels and the microchannels, respectively, of the natural reed.
Figure 4B:
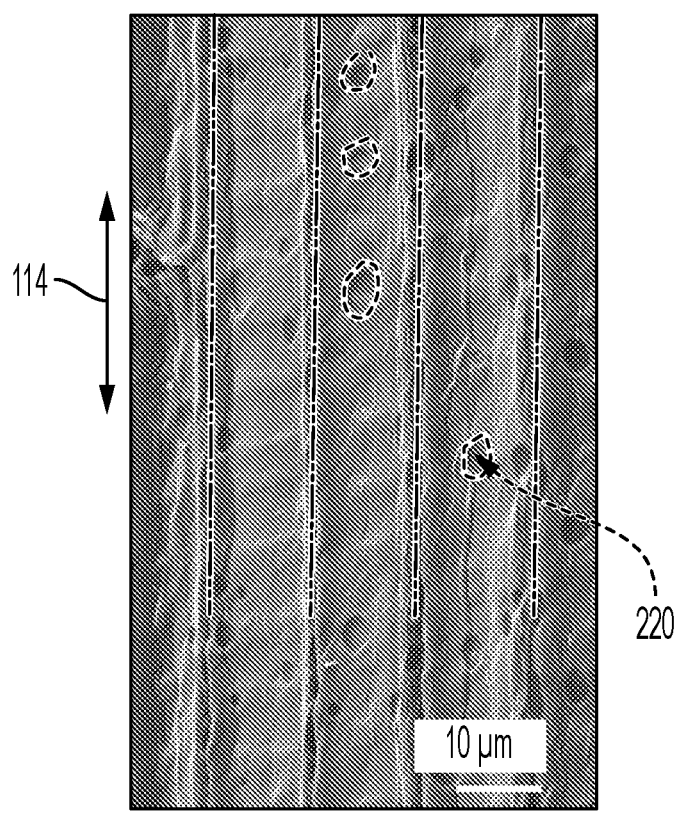
Figure 4C:
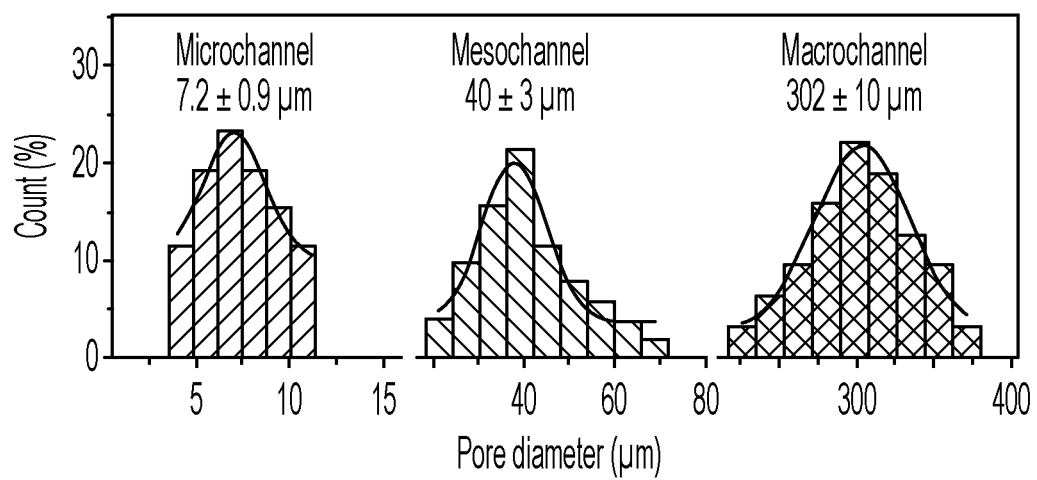
FIG. 4C is a graph showing size distribution of channels in the natural reed.

To form the evaporative device, a piece of natural reed is subjected to partial or complete delignification using one or more chemical treatments. Prior to delignification, natural reed 200 exhibits a cellular hierarchy of macro-scale vessels 206, and meso-scale vessels 216 and micro-scale fibers 218 within interstitial regions 208 between vessels 206, as shown in FIGS. 2A-2C. In their respective native states, lumina of the macro-scale vessels 206 have a diameter (also referred to as maximum cross-sectional dimension in a plane perpendicular to the longitudinal growth direction) of 302±10 µm, lumina of the meso-scale vessels 216 have a diameter of 40±3 µm, and lumina of the fibers 218 have a diameter of 7.2±0.9 µm, as shown in FIG. 4C. Moreover, as shown in FIGS. 4A-4B, the lateral surfaces (longitudinal cross-section) of the cell walls of the macro-scale vessels and the microscale fibers of the natural reed have narrowed or blocked pores 220. As a result, the natural reed exhibits a porosity of about 65%.

Figure 3A:
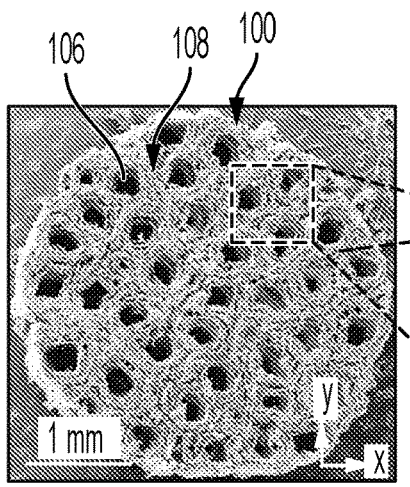
FIG. 3A is an SEM image of a transverse section of a piece of reed after delignification, according to one or more embodiments of the disclosed subject matter.
Figure 3B:
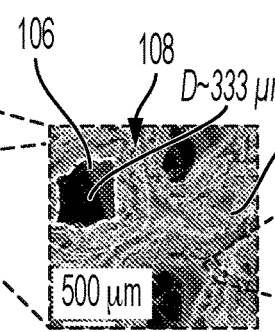
FIG. 3B is close-up SEM image of the highlighted portion of FIG. 3A showing various macrochannels of the delignified reed.
Figure 3C:
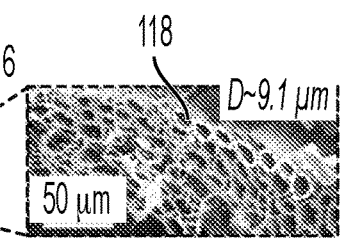
FIG. 3C is a close-up SEM image of the highlighted portion of FIG. 3B showing various microchannels of the delignified reed.
Figure 5A:
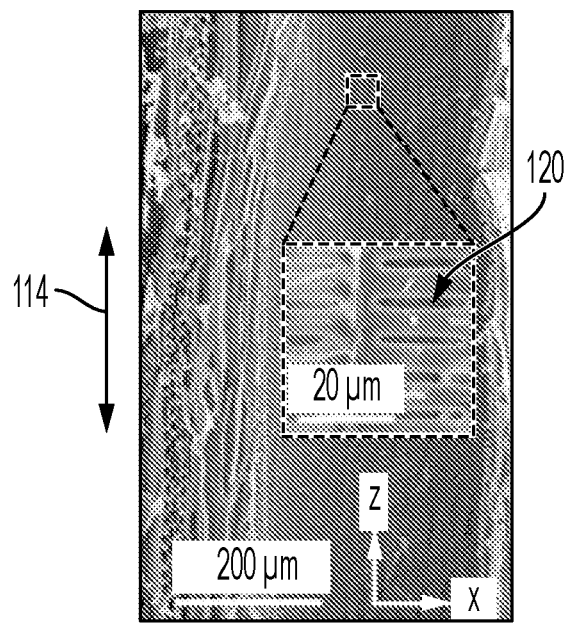
FIGS. 5A-5B are SEM images of a longitudinal cross-section showing lateral surfaces of the macrochannels and the microchannels, respectively, of the delignified reed, according to one or more embodiments of the disclosed subject matter.
Figure 5B:
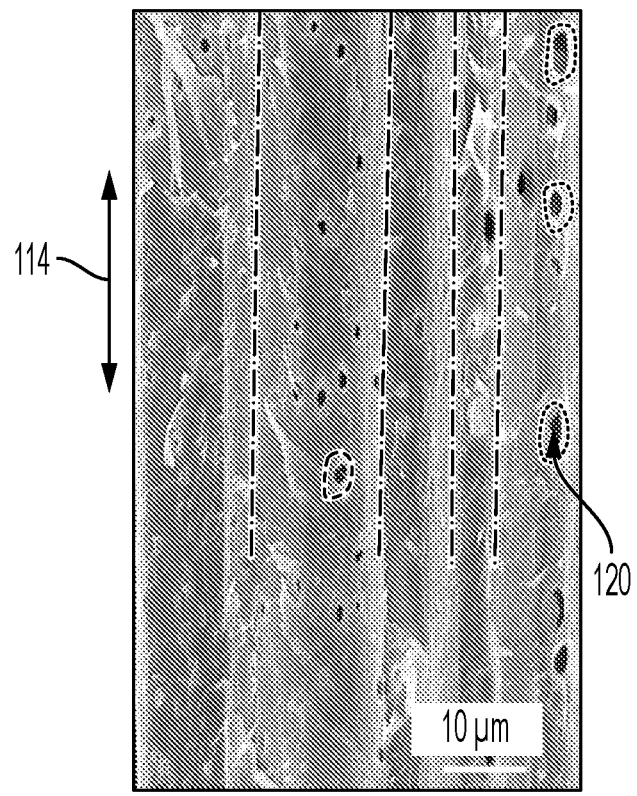
Figure 5C:
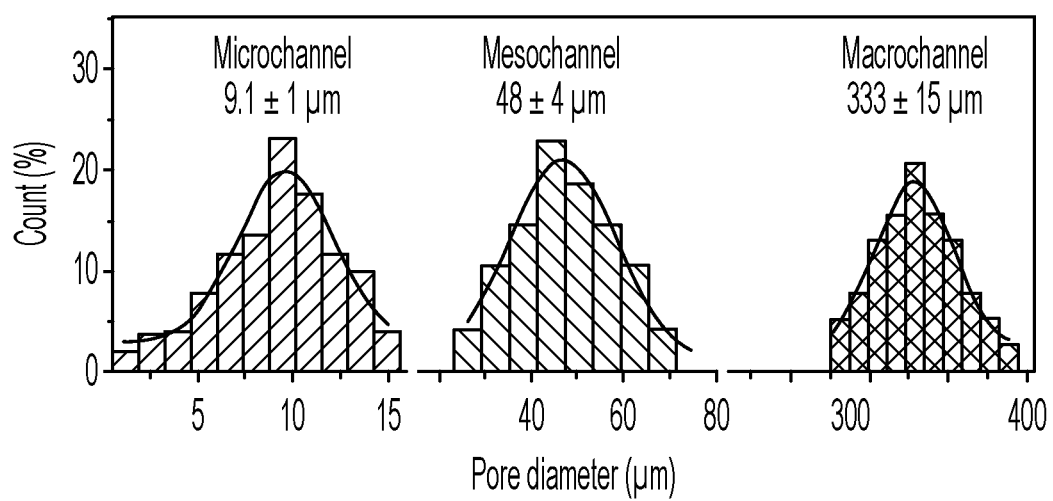
FIG. 5C is a graph showing size distribution of channels in the delignified reed, according to one or more embodiments of the disclosed subject matter.
Figure 6A:
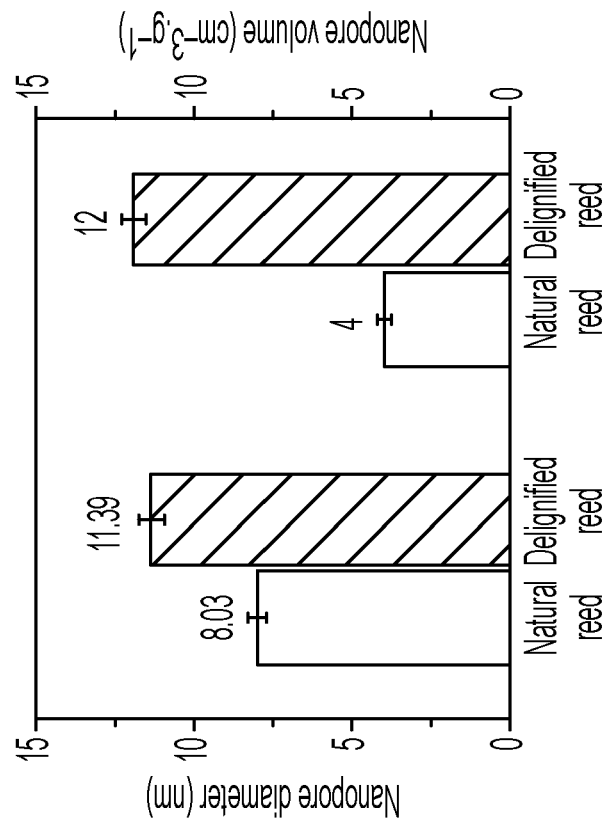
FIG. 6A is a graph comparing size distribution of nanopores in the natural reed and delignified reed.
Figure 6B:
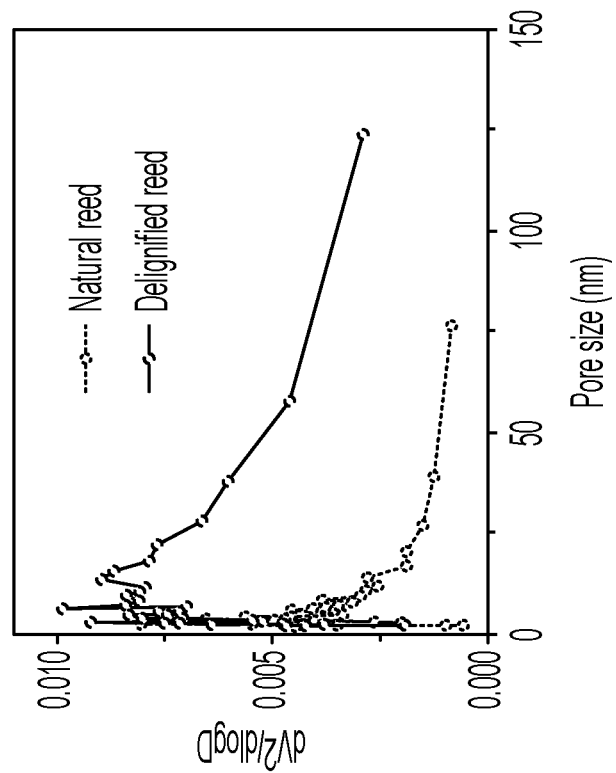
FIG. 6B is a graph comparing diameter and volume of nanopores in the natural reed and the delignified reed.

After partial or substantially complete delignification (e.g., using a bleaching aqueous solution of hydrogen peroxide), the resulting delignified reed 100 exhibits a more porous structure with enlarged lumina, as shown in FIGS. 3A-3C. As shown in FIG. 5C, lumina of the macro-scale vessels 106 have a diameter of 333±15 μm, lumina of the meso-scale vessels 116 have a diameter of 48±4 μm, and lumina of the fibers 118 have a diameter of 9.1±1 μm. Moreover, as shown in FIGS. 5A-5B, the lateral surfaces (longitudinal cross-section) of the cell walls of the macro-scale vessels and the microscale fibers of the delignified reed have a plurality of engineered micropores 120. The engineered micropores 120 can result from opening or expanding the previously closed or narrowed pits or pores 220 of the natural reed. Alternatively or additionally, the engineered micropores 120 can be formed in the cell walls at locations independent of any pre-existing pit or pore 220. The engineered micropores can have a diameter (also referred to as a maximum cross-sectional dimension) of 2 μm or less, for example, on the nano-scale. As shown in FIGS. 6A-6B, the delignified reed exhibits larger transverse pores and a larger number of pores as compared to the natural reed. As a result, the delignified reed exhibits a higher porosity of about 92% and increased surface area (e.g., from 3.76 cm$^2$/g for natural reed to 12.33 cm$^2$/g for substantially completely delignified reed, an increase of over 300%). Despite the changes in channel size and porosity, the cells walls defining the respective lumina retain their aligned fibrillar structure.

In operation of the evaporative device, the smaller channels (e.g., microchannels 118) support fluidic penetration and transport along the reed growth direction 114 due to capillary effects, whereas the larger channels (e.g., meso-channels 116 and macro-channels 106) mainly contributed to the evaporation of the fluid as a result of their larger evaporation area and exposed inner surfaces (e.g., due to insufficient fill of channels 106, 116 by a weaker capillary effect). Meanwhile, the engineered micropores 120 in the vessel and fiber walls, in addition to pre-existing ray cells that extend radially (e.g., perpendicular to the longitudinal growth direction 114), enhance transverse fluidic diffusion from microchannels 118 to the macro-channels 106 and/or meso-channels 116. The noted combination of features resulting from delignification of natural reed allows for improved fluid transport and evaporation, as compared to the natural reed and other evaporative structures.

Bamboo Implementations

Figure 7A:
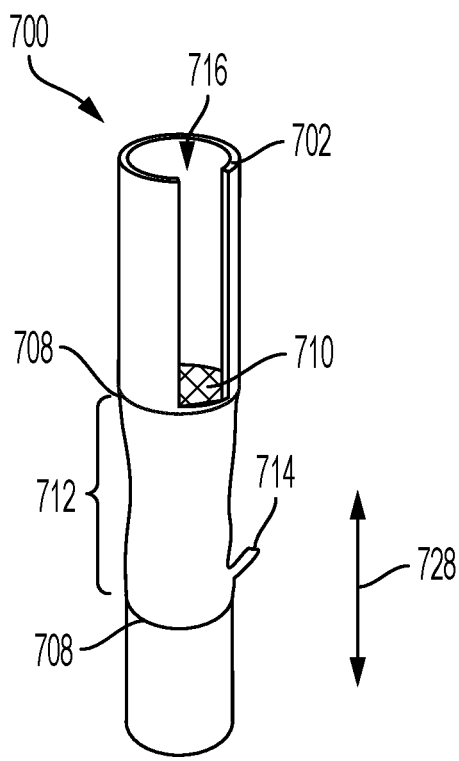
FIG. 7A is a simplified partial cut-away view of a natural bamboo segment that may be used to form an evaporative device, according to one or more embodiments of the disclosed subject matter.

Although the discussion above has focused on reed, other grasses can also be processed to achieve the same effect. For example, an evaporative device can be formed by subjecting a piece of natural bamboo to partial or complete delignification using one or more chemical treatments. FIG. 7A shows a partial cutaway view of a bamboo segment 700 in its naturally-occurring state. The segment 700 has a culm wall 702 surrounding a hollow interior region 716, which is divided along a length of the culm wall 702 into internal nodal regions 712 by nodes 708 formed by an internal nodal diaphragm 710. The culm wall 702 has fibers extending along a longitudinal direction 728 (e.g., bamboo growth direction or a direction substantially parallel to an axis defined by the hollow interior region 716) of the bamboo segment 700) that are embedded in a lignin matrix. One or more branch stubs 714 can extend from a particular internal nodal region 712 and can serve as the root from which a culm wall for a new bamboo segment may grow (e.g., thus defining a different longitudinal direction for the new segment).

Figure 7B:
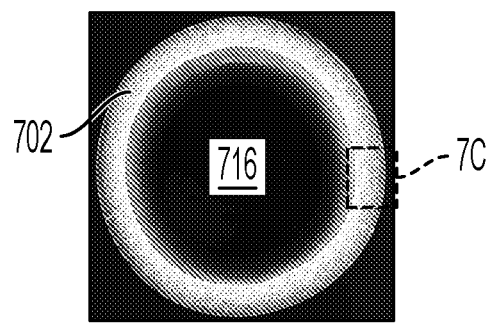
FIG. 7B is a top view image of a cross-section of a natural bamboo segment.
Figure 7C:
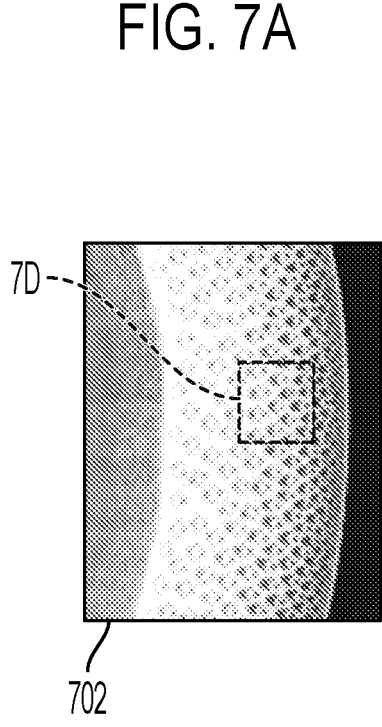
FIG. 7C is a magnified image of the culm of the natural bamboo segment of FIG. 7B.
Figure 7D:
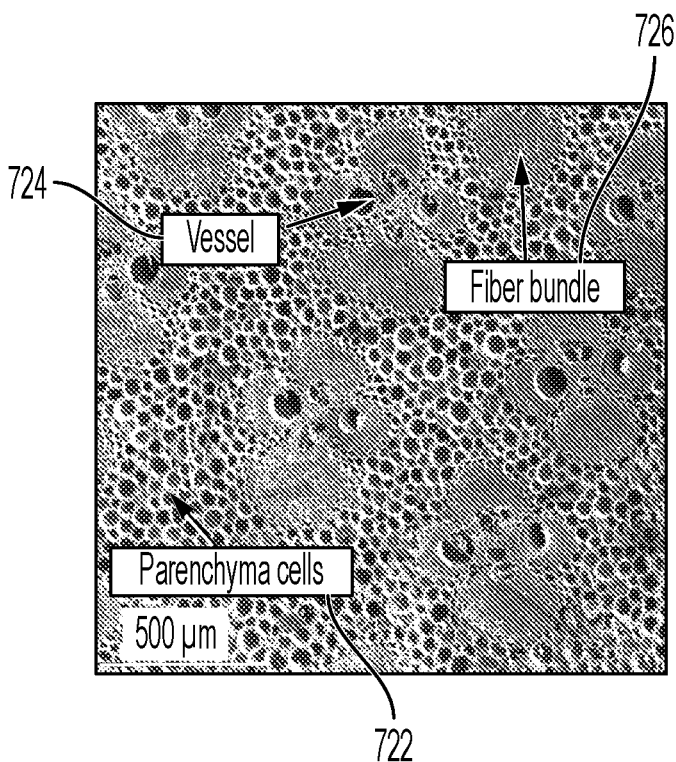
FIG. 7D is a further magnified SEM image showing the hierarchical microstructure of the culm wall of FIG. 7C.

Within the culm wall 702, the bamboo exhibits a hierarchical cellular structure with porous cells that provide nutrient transport and dense cells that provide mechanical support. For example, FIGS. 7B-7D show images of a cross-section of a bamboo segment 700, in particular, illustrating the microstructure of parenchyma cells 722, vessels 724, and fiber bundles 726 that constitute the culm wall 702. The fiber bundles 726 are highly aligned and extend substantially parallel to the longitudinal direction 728 whereas parenchyma cells 722 can be parallel or perpendicular to the longitudinal direction 728. Each vessel 724 defines an open lumen that extends along the longitudinal direction 728. Moreover, the elementary fibers that form the fiber bundles 726 also have irregular small lumina in a center thereof. The fiber bundles 726, parenchyma cells 722, and vessels 724 adhere to each other via a low strength polymer matrix composed of lignin and hemicellulose. The native microstructure can also exhibit pit apertures on the longitudinal walls of fibers, porosity introduced by the parenchyma cells, and/or open intercellular space between adjacent fibers.

Prior to delignification, natural bamboo exhibits a cellular hierarchy of macro-scale vessels 724, meso-scale parenchyma cells 722, and micro-scale fibers within fiber bundles 726, as shown in FIG. 7D. After partial or substantially complete delignification (e.g., using a bleaching aqueous solution of hydrogen peroxide), the resulting delignified bamboo can exhibit a more porous structure with enlarged lumina and engineered micropores, in a manner similar to that described above with respect to reeds. In operation of the bamboo evaporative device, the smaller channels (e.g., channels formed by fibers of bundle 726) support fluidic penetration and transport along the growth direction 728 due to capillary effects, whereas the larger channels (e.g., formed by parenchyma cells 722 and vessels 724) mainly contributed to the evaporation of the fluid as a result of their larger evaporation area and exposed inner surfaces (e.g., due to insufficient fill by the weaker capillary effect). Meanwhile, the engineered micropores in the vessel and fiber cell walls, in addition to any parenchyma cells that may extend radially (e.g., perpendicular to the longitudinal growth direction 728), enhance transverse fluidic diffusion from microchannels formed by fiber bundles 726 to the macro-channels formed by the vessels 724 and/or meso-channels formed by parenchyma cells 722.

Evaporative System Examples

Figures 8A, 8B:
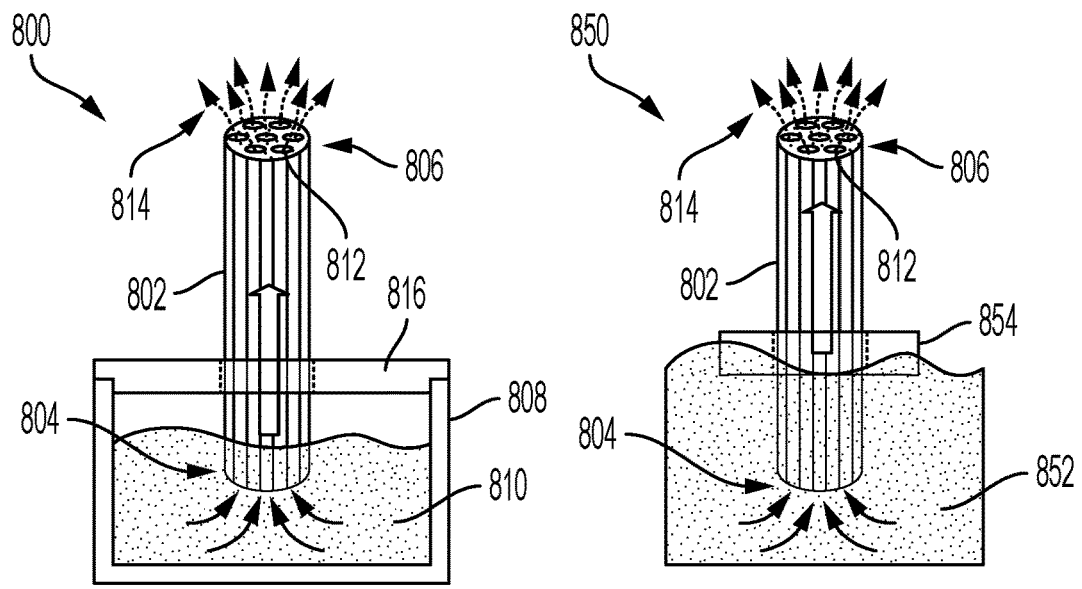
FIG. 8A is a simplified schematic diagram illustrating an evaporative system employing partially or fully delignified plant material, according to one or more embodiments of the disclosed subject matter.
FIG. 8B is a simplified schematic diagram illustrating another evaporative system employing partially or fully delignified plant material, according to one or more embodiments of the disclosed subject matter.

FIG. 8A illustrates an exemplary evaporative system 800 employing a piece of reed 802 that has been partially or substantially-completely delignified. In addition to the delignified reed 802, the evaporative system 800 can include a container 808 for holding a body of fluid 810 therein. For example, the body of fluid can comprise water (e.g., filtered water, tap water, sea water, contaminated water), alcohol (e.g., ethanol, methanol, isopropanol), perfume, fragrance, oil (e.g., essential oil), sterilant, or any combination thereof. A first end portion 804 of the delignified reed 802 can be immersed in, or at least in fluid communication with, the body of fluid 810, while a second end portion 806 is exposed to the environment. Fluid is transported vertically from the body of fluid 810 via internal microchannels within the delignified reed 802. Micropores within cell walls of the delignified reed 802 allow the transported fluid to pass through to the unfilled macrochannels 812, where spontaneous evaporation takes place. The resulting vapor 814 can exit from the reed 802 via the exposed end portion 806, as shown in FIG. 8A. In some embodiments, the evaporative system 800 can optionally include a lid 816, which has an opening therein to allow the delignified reed 802 to extend therethrough. The lid 816 can force evaporation to occur via the delignified reed 802 rather than via the top surface of the body of fluid 810 and/or protect the body of fluid 810 from contamination or exposure.

FIG. 8B illustrates another exemplary evaporative system 850, where the body of fluid 852 is not in a container, e.g., a free-standing body of fluid, such as a lake, ocean, river, pool, etc. In such a system, the delignified reed 802 can be coupled to a support structure 854 that keeps the reed 802 positioned with respect to the upper surface of the body of fluid 852 and in an upright position. In some embodiments, the support structure 854 can be a fixed structure that holds the reed 802 at a static position with respect to the body of fluid 852. Alternatively, in some embodiments, the support structure 854 can be configured to float on the upper surface of the body of fluid 852, thereby dynamically positioning the reed 802 within the fluid.

Similar evaporative devices and systems can be constructed by partial or substantially-complete delignification of other types of fibrous plant materials that have a natural microstructure composed of natural macrochannels (e.g., having a diameter greater than 100 μm) surrounded by natural microchannels (e.g., having a diameter less than 20 μm). For example, the natural plant material can be any natural grass of the Poales order or in the Poaceae family. Accordingly, although the above discussion is directed to delignified reeds and evaporative devices formed therefrom, embodiments of the disclosed subject matter are not limited to reeds.

In some embodiments, the selection of natural plant material for the evaporative device takes into account size differences between macrochannels and microchannels, which difference should large enough such that the microchannels preferentially fill with fluid while the macrochannels are at most partially-filled, thereby allowing evaporation to occur within the macrochannels. In contrast, the cellular structure of wood is primarily composed of channels of 10-100 μm in diameter. As a result, during transpiration, all of the wood channels are filled with fluid and only function as fluidic transport pathways, thereby isolating any evaporation to an upper exposed surface of the wood.

Method Examples

Figure 9:
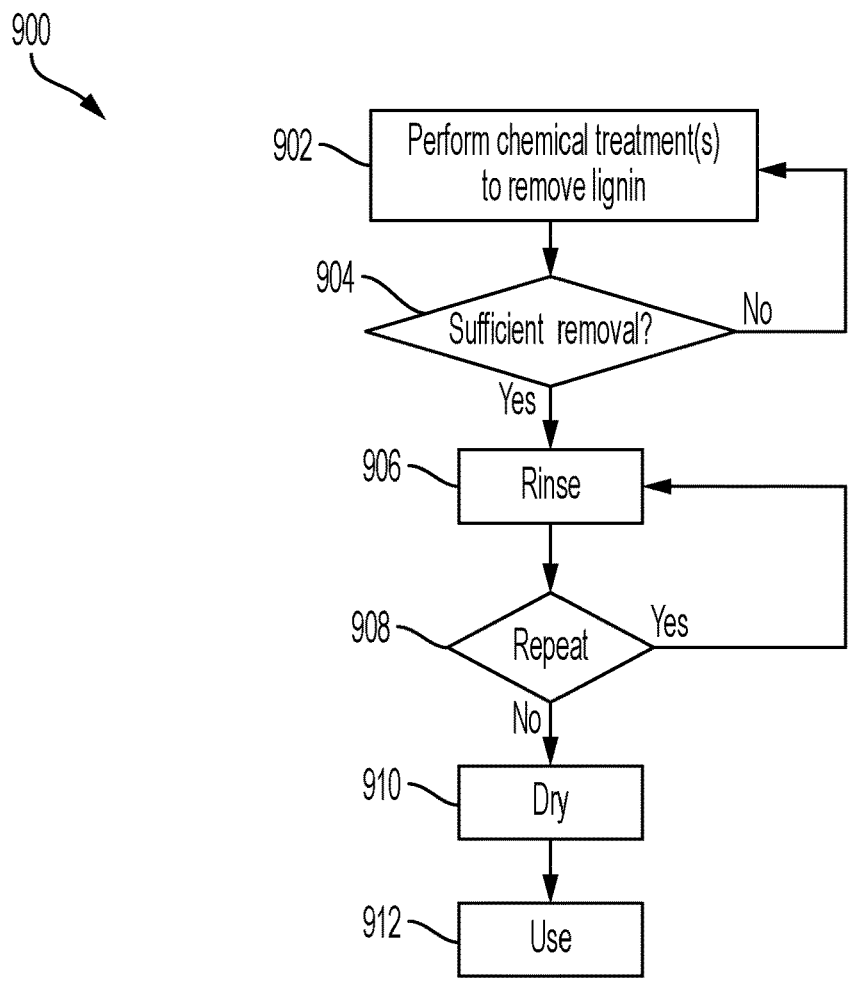
FIG. 9 is an exemplary process flow diagram for a method of fabricating an evaporative system employing partially or fully delignified plant material, according to one or more embodiments of the disclosed subject matter.

FIG. 9 illustrates an exemplary method 900 for fabrication and use of an evaporative system employing plant material. In some embodiments, the plant material is reed or bamboo. However, in other embodiments, the plant material can be any other fibrous plant that has a natural hierarchical cellular structure forming macrochannels (e.g., having a diameter greater than 100 μm) and surrounding aligned microchannels (e.g., having a diameter less than 20 μm). For example, the plant material could be other types of natural grass of the Poales order or of the Poaceae family.

At process block 902, the plant material is subjected to one or more chemical treatments to remove at least some lignin therefrom, for example, by immersion of the natural plant material (or a portion thereof) in a chemical solution associated with the treatment. In some embodiments, each chemical treatment or only some chemical treatments can be performed under vacuum, such that the solution associated with the treatment is encouraged to fully penetrate the cell walls and lumina of the natural plant material. Alternatively, in some embodiments, the chemical treatment(s) can be performed under ambient pressure conditions or elevated pressure conditions (e.g., ~6-8 bar). In some embodiments, each chemical treatment or some chemical treatments can be performed at any temperature between ambient (e.g., ~23° C.) and an elevated temperature where the solution associated with the chemical treatment is boiling (e.g., ~160° C.). In some embodiments, the solution is not agitated in order to minimize the amount of disruption to the microstructure of the natural plant material.

In some embodiments, the immersion time can range anywhere from 0.1 hours to 72 hours, for example, between 4 hours and 12 hours, inclusive. The amount of time of immersion within the solution may be a function of amount of lignin to be removed, size of the segment, temperature of the solution, pressure of the treatment, and/or agitation. For example, smaller amounts of lignin removal, smaller segment size, higher solution temperature, higher treatment pressure, and agitation may be associated with shorter immersion times, while larger amounts of lignin removal, larger segment size, lower solution temperature, lower treatment pressure, and no agitation may be associated with longer immersion times.

In some embodiments, the solution of the chemical treatment comprises an alkaline solution. In some embodiments, the solution of the chemical treatment can include sodium hydroxide (NaOH), lithium hydroxide (LiOH), potassium hydroxide (KOH), sodium sulfite ($Na_2SO_3$), sodium sulfide ($Na_2S$), $Na_nS$ (where n is an integer), urea ($CH_4N_2O$), sodium bisulfate ($NaHSO_3$), sulfur dioxide ($SO_2$), anthraquinone (AQ) ($C_{14}H_8O_2$), methanol ($CH_3OH$), ethanol ($C_2H_5OH$), butanol ($C_4H_9OH$), formic acid ($CH_2O_2$), hydrogen peroxide ($H_2O_2$), acetic acid ($CH_3COOH$), butyric acid ($C_4H_8O_2$), peroxyformic acid ($CH_2O_3$), peroxyacetic acid ($C_2H_4O_3$), ammonia ($NH_3$), tosylic acid (p-TsOH), sodium hypochlorite (NaClO), sodium chlorite ($NaClO_2$), chlorine dioxide ($ClO_2$), chorine ($Cl_2$), or any combination of the above. Exemplary combinations of chemicals for the chemical treatment can include, but are not limited to, $NaOH+Na_2SO_3$, $NaOH+Na_2S$, NaOH+urea, $NaHSO_3+SO_2+H_2O$, $NaHSO_3+Na_2SO_3$, $NaOH+Na_2SO_3$, NaOH+AQ, $NaOH+Na_2S+AQ$, $NaHSO_3+S_{O2}+H_2O+AQ$, $NaOH+Na_2SO_3+AQ$, $NaHSO_3+AQ$, $NaHSO_3+Na_2SO_3+AQ$, $Na_2SO_3+AQ$, $NaOH+Na_2S+Na_nS$ (where n is an integer), $Na_2SO_3+NaOH+CH_3OH+AQ$, $C_2H_5OH+NaOH$, $CH_3OH+HCOOH$, $NH_3+H_2O$, and $NaClO_2$+acetic acid.

At decision block 904, it is determined if sufficient lignin has been removed by the chemical treatment. If additional removal is desired, the method 900 can return to 902, where the same or a different chemical treatment is performed to remove additional lignin. For example, a first chemical treatment can be performed on the natural plant material using a mixture of NaOH and $Na_2SO_3$, and a subsequent second chemical treatment can be performed using a bleaching solution of $H_2O_2$. Alternatively, in some embodiments, a single chemical treatment can be performed, for example, by immersing the natural plant material in a bleaching solution of $H_2O_2$.

The chemical treatment can continue (or can be repeated with subsequent solutions) until a desired reduction in the amount of lignin in the natural plant material is achieved. The amount of lignin removed can between 0.1% (99.9% of lignin originally in the natural plant material is retained) and 100% (all of the lignin originally in the natural plant material is removed), depending upon the desired application. For example, in some embodiments where it may be desirable to retain as much of the natural plant material as possible, the amount of lignin removed can be small, such as at least 10% of the original lignin content is removed. In some embodiments, greater amounts of lignin can be removed, such as at least 90% of the original lignin content is removed (e.g., 90-100% lignin removed). Such higher levels of delignification may offer enhanced evaporative performance, although, in some embodiments, the strength of the resulting delignified structure may be compromised. In some embodiments, the amount of lignin removed can be at least 50% of the original lignin content.

In some embodiments when the natural plant material is reed, the amount of lignin removed can be such that the delignified reed has less than 11 wt % lignin therein (e.g., 0-11 wt % lignin), for example, less than or equal to 5 wt %, or even less than or equal to 2 wt %. In some embodiments when the natural plant material is bamboo, the amount of lignin removed can be such that the delignified bamboo has less than 18 wt % lignin therein (e.g., 0-18 wt % lignin), for example, less than or equal to 5 wt %, or even less than or equal to 2 wt %. In some embodiments, the delignification of process block 902 can also reduce hemicellulose content while increasing relative cellulose content. For example, the hemicellulose content can be reduced similar to the lignin content, and the cellulose content can increase to at least 50 wt %.

The removal of lignin from the natural plant material results in enlargement of the cellular lumina (e.g., diameters increased as compared to the natural plant material), enhanced hydrophilicity, and provision or enhancement of the pores (e.g., engineered micropores) within cell walls. In some embodiments, the modified plant material resulting from delignification can have first enlarged cellular lumina (e.g., formed by vessels of the original plant material) that have a diameter of at least 100 μm (e.g., 200-400 μm, inclusive), and second enlarged cellular lumina (e.g., formed by fibers of the original plant material) that have a diameter of 20 μm or less (e.g., 10±5 μm). In some embodiments, the engineered micropores can have a diameter (e.g., maximum cross-sectional dimension) that is less than or equal to 2 μm. In some embodiments, at least some of the engineered micropores can have a sub-micron diameter (nano-scale) and may thus be considered nanopores. In some embodiments, at least some of the engineered micropores did not exist in a microstructure of the original plant material, while others of the engineered micropores may have previously existed but have been opened or enlarged by the delignification.

As a result of the engineered micropores and/or lumina enlargement, the delignified plant material can have an increased porosity (e.g., at least 75%), a decreased density (e.g., less than or equal to 0.5 g/cm$^3$), an increased surface area (e.g., increased by a factor of two, or at least 5 cm$^2$/g), an increased water retention value (e.g., at least 1.5 g/g), or any combination thereof, as compared to the natural plant material. Alternatively or additionally, the removal of lignin by the delignification process can improve the hydrophilicity of the plant material, such that the delignified plant material exhibits an initial water contact angle of 10° or less on a cross-sectional surface thereof.

Once sufficient lignin has been removed by the chemical treatment(s), the method 900 can proceed from decision block 904 to process block 906, where rinsing is performed. For example, the delignified plant material can be partially or fully immersed in one or more rinsing solutions. The rinsing solution can be a solvent, such as but not limited to, de-ionized (DI) water, alcohol (e.g., ethanol, methanol, isopropanol, etc.), or any combination thereof. For example, the rinsing solution can be formed of equal volumes of water and ethanol. In some embodiments, the rinsing can be performed without agitation, for example, to avoid disruption of the microstructure. At decision block 908, it is determined if additional rinsing is desired. If additional rinsing is desired, the method 900 can return to 906, where the delignified plant material is rinsed with the same or a different rinsing solution. For example, the rinsing may be repeated at least 3 times using a fresh mixture of ethanol and water for each iteration.

Once rinsing has been completed, the method 900 can proceed from decision block 908 to process block 910, where drying is performed. The drying of process block 910 can include any of conductive, convective, and/or radiative heating processes, including but not limited to an air-drying process, a vacuum-assisted drying process, an oven drying process, a freeze-drying process, a critical point drying process, a microwave drying process, or any combination of the above. For example, an air-drying process can include allowing the delignified plant material to naturally dry in static or moving air, which air may be at any temperature, such as room temperature (e.g., 23° C.) or at an elevated temperature (e.g., greater than 23° C.). For example, a vacuum-assisted drying process can include subjecting the delignified plant material to reduced pressure, e.g., less than 1 bar, for example, in a vacuum chamber or vacuum oven. For example, an oven drying process can include using an oven, hot plate, or other conductive, convective, or radiative heating apparatus to heat the delignified plant material at an elevated temperature (e.g., greater than 23° C.), for example, 70° C. or greater. For example, a freeze-drying process can include reducing a temperature of the delignified plant material to below a freezing point of the fluid therein (e.g., less than 0° C.), then reducing a pressure to allow the frozen fluid therein to sublime (e.g., less than a few millibars). For example, a critical point drying process can include immersing the delignified plant material in a fluid (e.g., liquid carbon dioxide), increasing a temperature and pressure of the bamboo segment past a critical point of the fluid (e.g., 7.39 MPa, 31.1° C. for carbon dioxide), and then gradually releasing the pressure to remove the now gaseous fluid. For example, a microwave drying process can include using a microwave oven or other microwave generating apparatus to induce dielectric heating within the delignified plant material by exposing it to electromagnetic radiation having a frequency in the microwave regime (e.g., 300 MHz to 300 GHz), for example, a frequency of ~915 MHz or ~2.45 GHz.

The method 900 can proceed to process block 912, where the dried, delignified plant material is adapted for subsequent use as an evaporative device. In some embodiments, the adaptation for use can include forming, depositing, or otherwise providing an anti-bacterial or anti-viral coating on internal and/or external surfaces of the delignified plant material. For example, the coating can be provided by forming a salt (e.g., a Cu$^l$ salt formed within the delignified plant material using a CuCl$_2$ solution) or depositing particles (e.g., Ag nanoparticles or nanowires) within the microstructure of the delignified plant material.

Once ready for use as an evaporative device, one longitudinal end of the delignified plant material can be placed within, or otherwise in fluid communication with, a body of fluid to be evaporated while an opposite longitudinal end of the delignified plant material is left exposed to the environment. Fluid is preferentially transported along the microchannels of the delignified plant material due to their hydrophilic nature and the capillary effect. The transported fluid is conveyed laterally via the engineered pores in the cell walls from microchannels to macrochannels, where the larger inner surface allows efficient fluidic evaporation. In some embodiments, the evaporative device formed by the delignified plant material can be used as a fragrance diffuser, an evaporator for sterilant to kill airborne pathogens (e.g., bacteria, virus, mold, etc.), a humidifier, a distillation device (e.g., for producing clean water by collecting the resulting vapor), or in any other evaporative application. Other applications beyond those specifically listed are also possible for the delignified plant material fabricated according to the disclosed technology. Indeed, one of ordinary skill in the art will readily appreciate that the delignified plant materials disclosed herein can be adapted to other applications based on the teachings of the present disclosure.

Although some of blocks 902-912 of method 900 have been described as being performed once, in some embodiments, multiple repetitions of a particular process block may be employed before proceeding to the next decision block or process block. In addition, although blocks 902-912 of method 900 have been separately illustrated and described, in some embodiments, process blocks may be combined and performed together (simultaneously or sequentially). Moreover, although FIG. 9 illustrates a particular order for blocks 902-912, embodiments of the disclosed subject matter are not limited thereto. Indeed, in certain embodiments, the blocks may occur in a different order than illustrated or simultaneously with other blocks. For example, the adaptation for use in process block 912 can occur before the drying of process block 910.

Fabricated Examples and Experimental Results

In one fabricated example, 10 cm natural reeds were immersed in a boiling solution containing NaOH (7%) and $Na_2SO_3$ (5%) for 5 hours to partially (but not fully) remove lignin and hemicellulose. The chemically-treated reeds were washed with de-ionized (DI) water in order to remove chemicals and other impurities. Then the partially-delignified reeds were subjected to a bleaching solution of $H_2O_2$ (5%) and acetic acid (pH=4) for 4 hours to achieve substantially complete delignification. The delignified reeds were then washed with DI water/ethanol solution ($V_{water}$:$V_{ethanol}$=1:1) in order to remove chemicals and other impurities. After the washing process, the delignified reeds (now white in color) were retained in DI water/ethanol solution until ready for evaporative use or testing.

In another fabricated example, a natural reed was cut perpendicularly to the reed growth direction to obtain reed strips (3 mm in diameter and 30 cm in length). The reeds were immersed in a bleaching aqueous solution (2.5 mol $L^{-1}H_2O_2$) and boiled at mild conditions until the reed turned white. The delignified reed was then rinsed in an ethanol/water solution three times to remove the residual chemicals. The delignified reed samples were then dried in air. This treatment led a reduction in the content of lignin from 21.8 wt % in the natural reed to 1.2 wt % in the delignified reed, a reduction in the content of hemicellulose from 23.9 wt % in the natural reed to 16.3 wt % in the delignified reed, and an increase in the content of cellulose from 44.2 wt % in the natural reed to 78.5 wt % in the delignified reed. The overall weight of the reed after delignification was reduced by 28% as compared to prior to delignification. As a result of the lignin and hemicellulose removal, the density of the reed also decreases from 0.39 $g/cm^3$ of the natural reed to 0.25 $g/cm^3$ for the delignified reed. Although most of the lignin and some of the hemicellulose are removed, the reed maintains its mechanical strength and hierarchically porous structure, with enlarged channels sizes, as well as more microscale and nanoscale pores (referred to collectively herein as micropores). On a stress strain curve, the delignified reed exhibits a slightly reduced strength (~37 MPa) compared to natural reed (40 MPa), but an improved Youngs modulus of 3.1 GPa as compared to 1.6 GPa for the natural reed.

After the removal of lignin, the resulting delignified reed exhibits a more porous structure with enlarged vessel channels (diameter: 333±15 μm and 48±4 μm) and fibers (diameter: 9.1±1 μm), as well as more nanoscale channels with increased diameter and volume than the natural reed with small vessel channels (diameter: 302±10 μm and 40±3 μm) and fibers (diameter: 7.2±0.9 μm). In addition, numerous micropores (e.g., pits) on the vessels and fiber walls of the delignified reed are opened and enlarged. Delignification endows the reed material with a high porosity of 92%, which is much higher than the natural reed (65%), as well as a 3.3-times increase in the surface area to 12.44 $cm^2/g$ from 3.76 $cm^2/g$. Despite these changes, small angle X-ray scattering (SAXS) analysis confirmed that the delignified reed retains an aligned fibrillar structure.

Figure 11A:
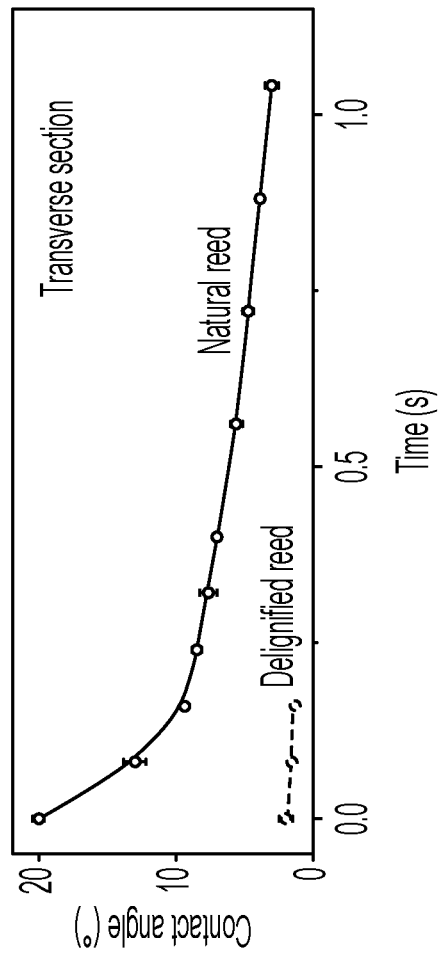
FIG. 11A is a graph comparing contact angles versus time for fluid on transverse cross-sections of natural and delignified reeds.
Figure 11B:
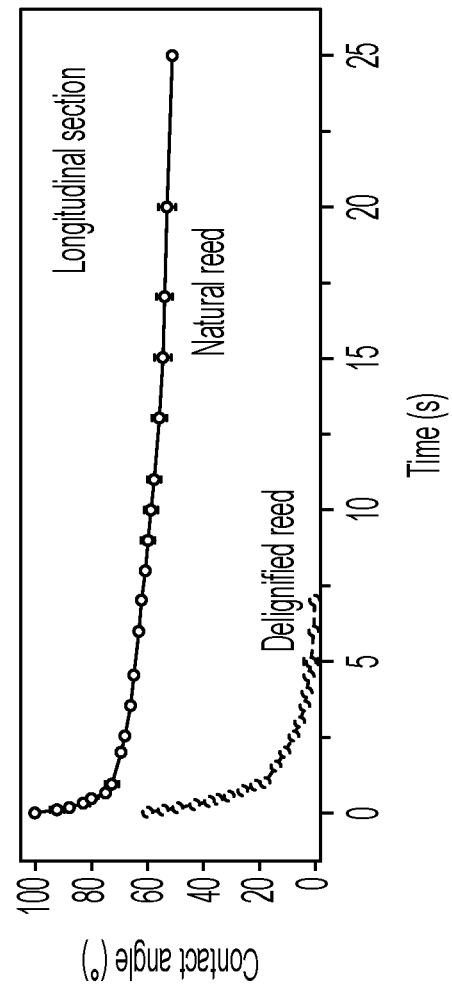
FIG. 11B is a graph comparing contact angles versus time for fluid on longitudinal cross-sections of natural and delignified reeds.
Figure 10A:
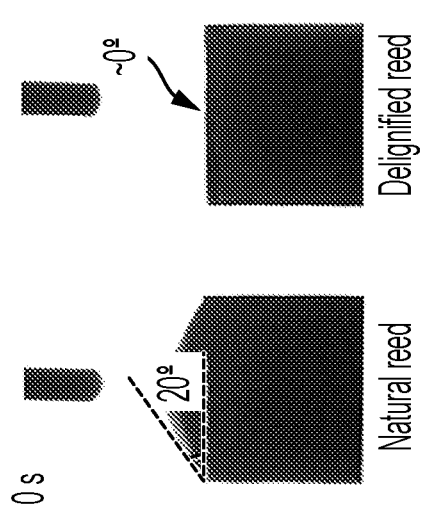
FIG. 10A compares the initial contact angles for fluid on a transverse cross-section of natural and delignified reeds.
Figure 10B:
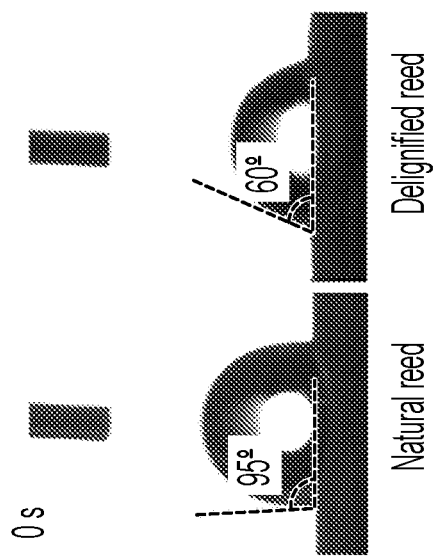
FIG. 10B compares the initial contact angles for fluid on a longitudinal cross-section of natural and delignified reeds.

The improvement in hydrophilic nature of the delignified reed was demonstrated by virtue of its water retention value, e.g., 2.8 g/g for the delignified reed as compared to just 1.4 g/g for natural reed. The contact angle was also measured to further analyze the hydrophilic properties of the natural and delignified reeds. With respect to the transverse section, the natural reed exhibited an initial contact angle of ~20°, as shown in FIGS. 10A and 11A. However, the initial contact angle of the delignified reed was significantly lower at almost 0°, as shown in FIGS. 10A-11A. The almost non-existent initial contact angle is indicative of the improved hydrophilic nature of the delignified reed, which can be used to promote the rapid transport of fluid along the delignified reed stem. In addition, the small contact angle of ~0° on the cross-section surface of the delignified reed can be attributed to the high porosity and increased pore size due to the delignification treatment, which allows the droplet to be rapidly drawn into the perpendicular channels via the capillary-effect. As shown in FIGS. 10B and 11B, in a longitudinal cross-section, the solution on the delignified reed completely wets the surface within 7.5 s from an initial contact angle of 60°. In contrast, the longitudinal cross-section of the natural reed exhibits a rather large fluid contact angle of 50° even after 20 s, as well as a large initial contact angle of 95°, as shown in FIGS. 10B and 11B.

Figure 12A:
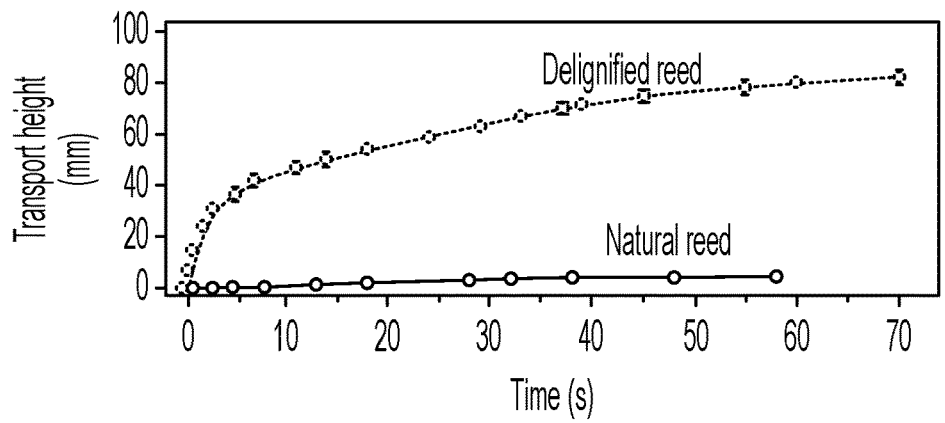
FIG. 12A is a graph comparing fluid transport height versus time for natural and delignified reeds.

The fluidic transport behaviors of natural and delignified reeds were compared by analyzing the time-dependent climbing height of a violet $KMnO_4$ solution (e.g., a mixed ethanol and water solution containing 3% $KMnO_4$). In comparison to the negligible transport height of the fluidic solution in the natural reed, the delignified reed is able to upwardly draw the fluidic solution to a height of 65 mm at 30 s, and a final height of ~100 mm against gravity, as shown in FIG. 12A. The spontaneous fluidic transport performance of the delignified reed is substantially improved (160-fold) compared to the natural reed, increasing from 0.09 mm/s to 14.7 mm/s, respectively. The efficient upward transport of the fluid in the delignified reed originates from its uniquely porous microstructure and super hydrophilicity, in which the hydrophilic cellulose-based microchannels mainly help to draw the fluidic solution due to the capillary effect.

Using the natural and delignified reeds, respective evaporator devices were constructed (e.g., similar to the configuration of FIG. 8A) to compare the ability of the devices to draw, transport, and evaporate a solution from a reservoir. The solution in the reservoir was a mixture of ethanol and water (1:1 at volume). The reeds were added to the solution-containing bottle to evaporate the solution. The delignified reed demonstrates effective fluidic evaporation, which was indicated by the appearance of visible vapor at the top of the delignified reeds, while no such vapor was observed over the natural reeds due to their weak fluidic evaporation performance.

Figure 12B:
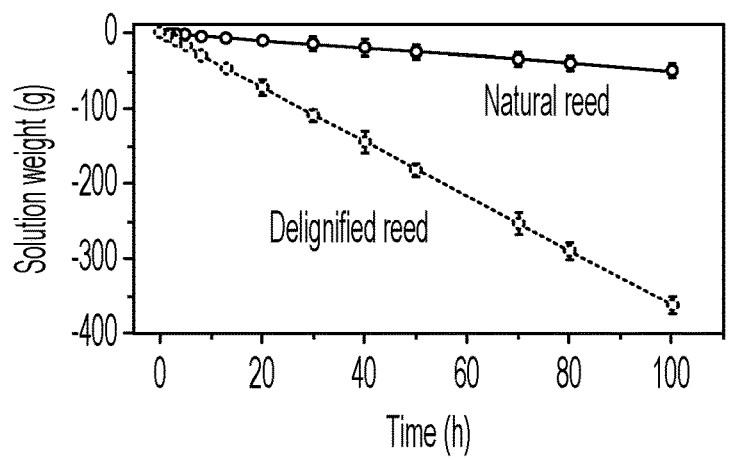
FIG. 12B is a graph comparing evaporation versus time for evaporators employing natural and delignified reeds.

The fluidic weight loss as a function of time to further investigate the evaporation performance of the delignified reed evaporator at a relative humidity of 20%. The system weight was detected using an electric balance to quantify the rate of the solution evaporation. As shown in FIG. 12B, the fluidic weight decreases more rapidly for the delignified reed evaporator than the natural reed evaporator (181 g after 50 h for the delignified reed versus 25 g after 50 h for the natural reed). This corresponds to a 7-times higher fluidic evaporation rate (e.g., 46.9 kg/(m²·h) for delignified reed versus 6.7 kg/(m²·h) for natural reed, calculated based on the evaporative area of top surface of the corresponding reed, or 0.12 kg/(m²·h) vs. 0.017 kg/(m²·h), calculated based on the evaporative area of the total outer surface of the corresponding reed). The main reason for the high performance of the delignified reed evaporator can be attributed to its hierarchically porous structure with multiscale channels, which decouples the fluidic transport and evaporation. The fast fluidic transport is primarily a function of the capillary effect in the microchannels (~9.1 μm diameter), which provide a sufficient supply for fluidic evaporation, while the high evaporation rate is preferentially achieved in the macrochannels (~333 μm diameter) that offer a larger evaporation area.

Figure 12C:
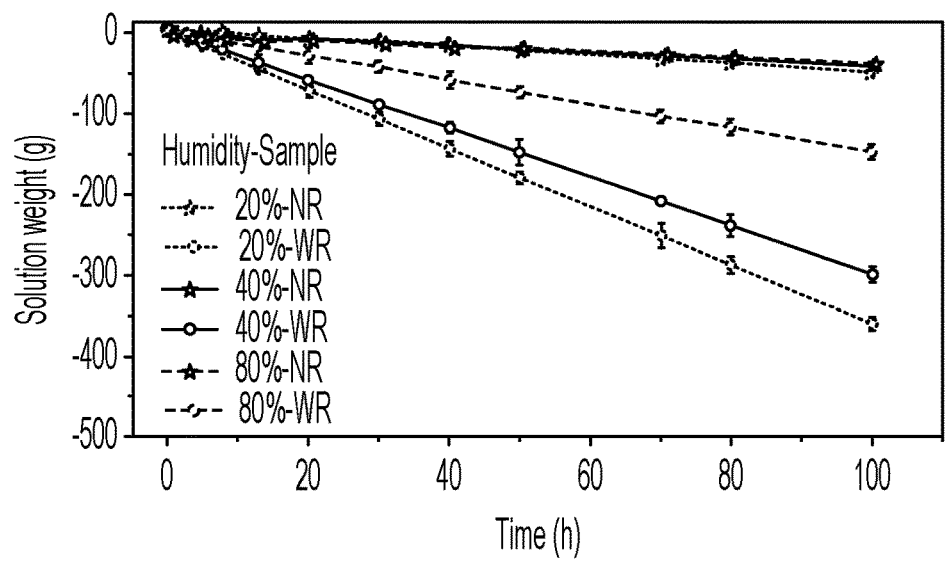
FIG. 12C is a graph comparing evaporation versus time for evaporators employing natural and delignified reeds at various relative humidity levels.
Figure 12D:
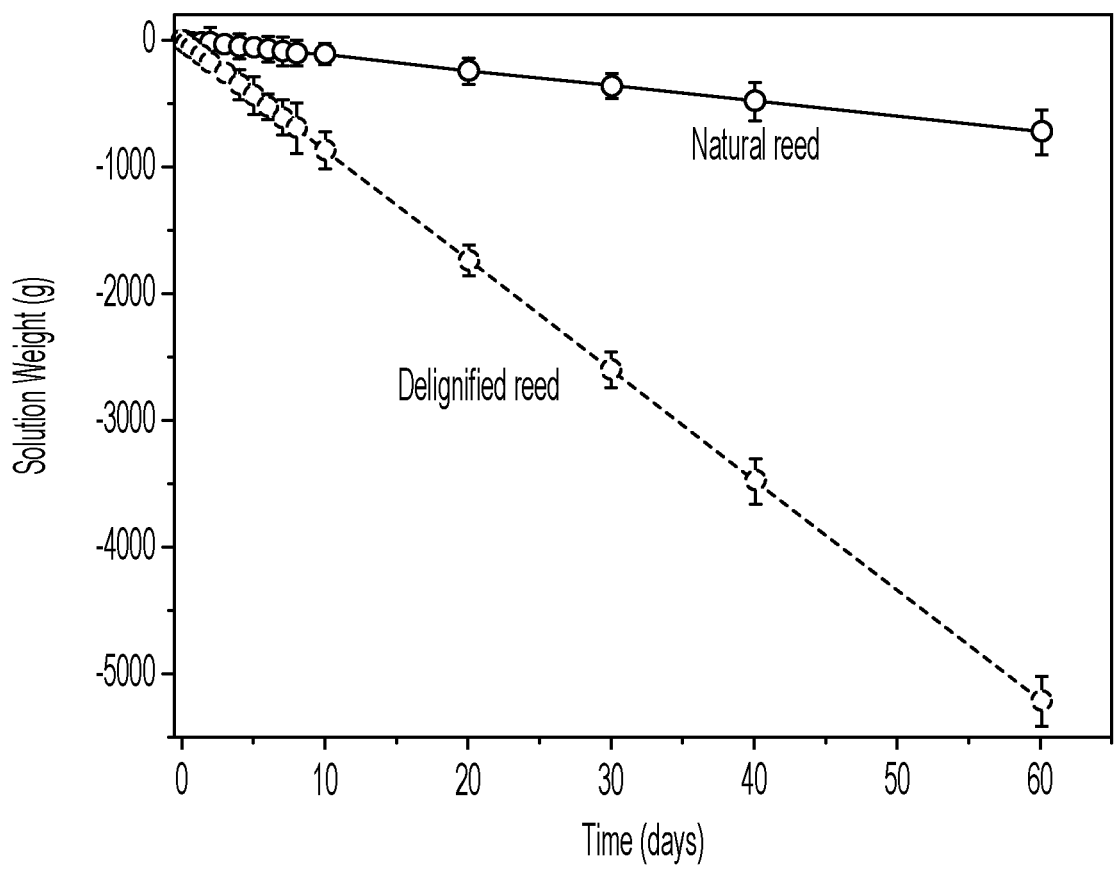
FIG. 12D is a graph comparing evaporation versus for evaporators employing natural and delignified reeds over several days of operation.

The effect of humidity on evaporation rate for natural reed and delignified reed evaporators was also evaluated. Despite high humidity conditions, the delignified reed demonstrates a higher evaporation rate than the natural reed, as shown in FIG. 12C. For example, at a 40% relative humidity, the evaporation rate of the delignified reed is 39.7 kg/(m²·h), which is 6.7-times higher than the natural reed. Moreover, the evaporation performance of the delignified reed at a high relative humidity of 80% is still superior to that of the natural reed at a low relative humidity of 20% (e.g., 19.8 kg/(m²·h) for the delignified reed at 80% humidity versus 6.7 kg/(m²·h) at 20% humidity for natural reed). Additionally, the stability of the delignified reed's evaporation performance was evaluated over 60 days of continuous operation. Over the period of observation, the delignified reed evaporator yielded a linear relationship between solution weight loss and evaporation time, as shown in FIG. 12D, with a stable evaporation rate of 1120 kg/(m²·h).

Figure 13A:
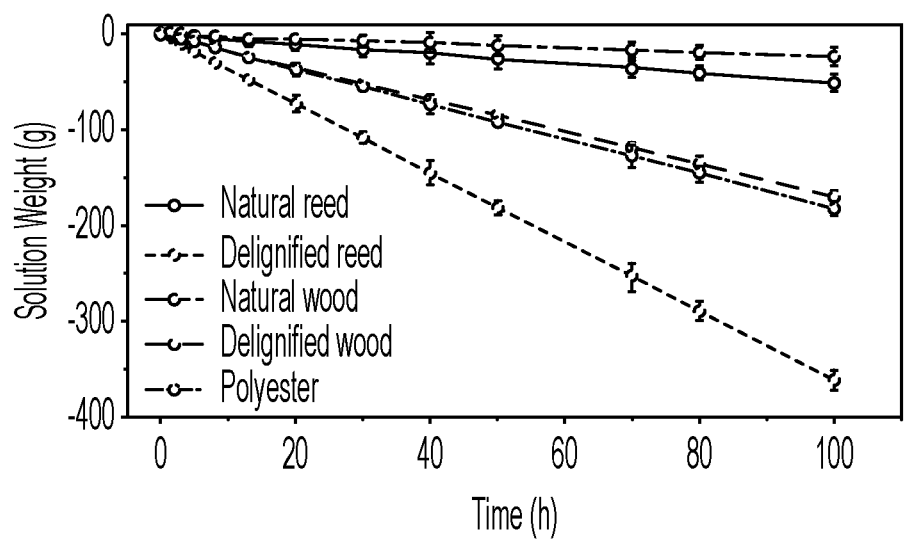
FIG. 13A is a graph comparing evaporation versus time for evaporators employing natural reed, delignified reed, natural wood, delignified wood, and polyester.
Figure 13B:
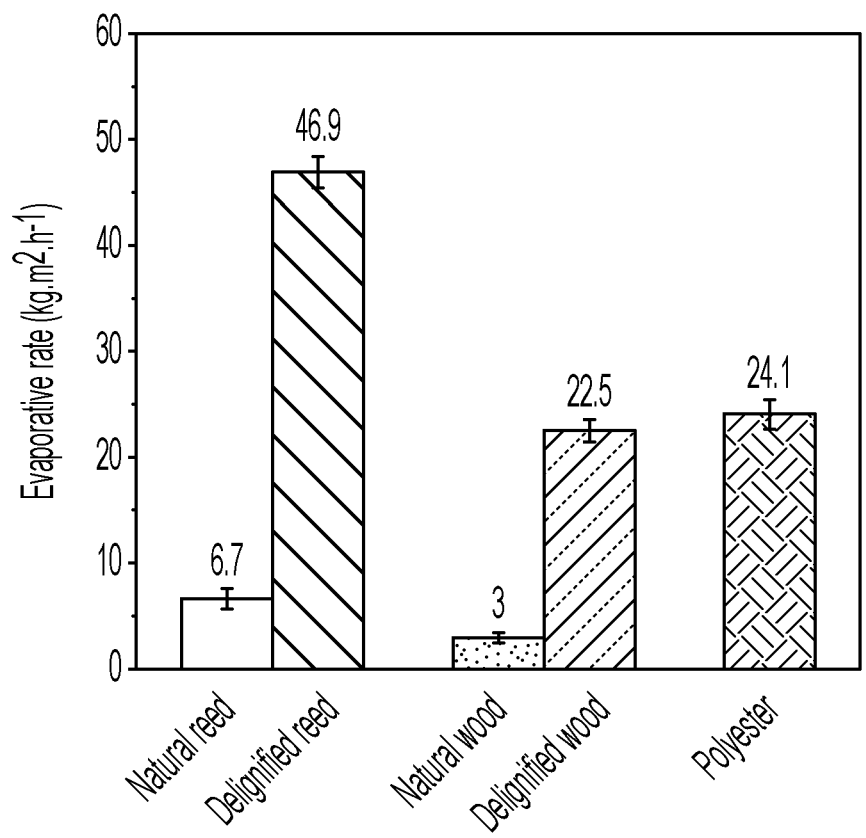
FIG. 13B is a graph comparing evaporation rates for evaporators employing natural reed, delignified reed, natural wood, delignified wood, and polyester.

The unique structure-dominated, high-rate fluidic evaporation was further demonstrated by comparing the evaporation performance of the delignified reed evaporator with delignified basswood and polyester evaporators, which lack macro-sized (>100 μm) channels. As shown in FIGS. 13A-13B, due to the lack of macroscale channels as evaporation pathways, both the delignified wood and polyester provide much lower evaporation rates than the delignified reed (e.g., 22.5 kg/(m²·h) for delignified wood and 24.1 kg/(m²·h) for polyester, versus 46.9 kg/(m²·h) for delignified reed).

Additional Examples of the Disclosed Technology

In view of the above described implementations of the disclosed subject matter, this application discloses the additional examples in the clauses enumerated below. It should be noted that one feature of a clause in isolation, or more than one feature of the clause taken in combination, and, optionally, in combination with one or more features of one or more further clauses are further examples also falling within the disclosure of this application.

Clause 1. An evaporative device comprising:
a piece of at least partially-delignified plant material having a modified microstructure comprising:
a plurality of vessels, each vessel defining a first lumen having a maximum cross-sectional dimension of at least 100 μm (e.g., 200-400 μm, inclusive);
a plurality of fibers, each fiber defining a second lumen having a maximum cross-sectional dimension less than or equal to 20 μm (e.g., 10±5 μm, inclusive); and
a plurality of engineered micropores that extend through walls of the vessels or fibers so as to fluidically interconnect the first and second lumina.

Clause 2. The evaporative device of any clause or example herein, in particular Clause 1, wherein the vessels and the fibers extend along an extension direction that is substantially parallel to a longitudinal growth direction of an original natural plant material, and the engineered micropores extend along a direction that is perpendicular to, or at least crosses, the extension direction.

Clause 3. The evaporative device of any clause or example herein, in particular any one of Clauses 1-2, wherein the engineered micropores have a maximum cross-sectional dimension less than or equal to 2 μm (e.g., with at least some having cross-sectional dimension less than or equal to 100 nm).

Clause 4. The evaporative device of any clause or example herein, in particular any one of Clauses 1-3, wherein the plant material is reed or bamboo.

Clause 5. The evaporative device any clause or example herein, in particular any one of Clauses 1-4, wherein the plant material is reed and a lignin content in the piece of at least partially-delignified plant material is less than or equal to 11 wt %, or the plant material is bamboo and a lignin content in the piece of at least partially-delignified plant material is less than or equal to 18 wt %.

Clause 6. The evaporative device any clause or example herein, in particular any one of Clauses 1-5, wherein a lignin content in the piece of at least partially-delignified plant material is less than or equal to 5 wt % (e.g., less than or equal to 2 wt %).

Clause 7. The evaporative device of any clause or example herein, in particular any one of Clauses 1-6, wherein a hemicellulose content in the piece of at least partially-delignified plant material is at least than or equal to 15 wt %.

Clause 8. The evaporative device of any clause or example herein, in particular any one of Clauses 1-7, wherein a cellulose content in the piece of at least partially-delignified plant material is at least 50 wt %.

Clause 9. The evaporative device of any clause or example herein, in particular any one of Clauses 1-8, wherein:
the maximum cross-sectional dimensions of the vessels in the modified microstructure are greater than maximum cross-sectional dimensions of vessels in a microstructure of an original natural plant material;
the maximum cross-sectional dimensions of the fibers in the modified microstructure are greater than maximum cross-sectional dimensions of fibers in a microstructure of an original natural plant material; or
any combination thereof.

Clause 10. The evaporative device of any clause or example herein, in particular any one of Clauses 1-9, wherein at least some of the engineered micropores in the modified microstructure did not exist in a microstructure of an original natural plant material, at least some of the engineered micropores in the modified microstructure are opened or expanded pits or pores from the original natural plant material, or both.

Clause 11. The evaporative device of any clause or example herein, in particular any one of Clauses 1-10, wherein the modified microstructure is constructed such that longitudinal transport of fluid through the piece preferentially occurs via the second lumina and evaporation of fluid preferentially occurs via the first lumina.

Clause 12. The evaporative device of any clause or example herein, in particular any one of Clauses 1-11, wherein a density of the piece of at least partially-delignified plant material is less than 0.5 g/cm$^3$ (e.g., less than or equal to 0.3 g/cm$^3$).

Clause 13. The evaporative device of any clause or example herein, in particular any one of Clauses 1-12, wherein a porosity of the piece of at least partially-delignified plant material is at least 75%.

Clause 14. The evaporative device of any clause or example herein, in particular any one of Clauses 1-13, wherein a surface area of the piece of at least partially-delignified plant material is at least 5 cm$^2$/g (e.g., at least 7.5 cm$^2$/g).

Clause 15. The evaporative device of any clause or example herein, in particular any one of Clauses 1-14, wherein the piece of at least partially-delignified plant material is constructed to provide a water retention value of at least 1.5 g/g (e.g., at least 2 g/g).

Clause 16. The evaporative device of any clause or example herein, in particular any one of Clauses 1-15, wherein the piece of at least partially-delignified plant material is constructed to provide an initial water contact angle of 10° or less on a cross-sectional surface thereof.

Clause 17. The evaporative device of any clause or example herein, in particular any one of Clauses 1-16, wherein the piece of at least partially-delignified plant material comprises an anti-bacterial or anti-viral coating.

Clause 18. The evaporative device of any clause or example herein, in particular Clause 17, wherein the antibacterial or anti-viral coating comprises a Cu' salt, Ag nanoparticles, Ag nanowires, or any combination thereof.

Clause 19. A system comprising:
the evaporative device of any clause or example herein, in particular any one of Clauses 1-18; and
a body of fluid,
wherein a first portion of the piece of at least partially-delignified plant material is disposed within the body of fluid and a second portion of the piece of at least partially-delignified plant material is exposed to a surrounding environment,
wherein the evaporative device is constructed to evaporate fluid from said body into the surrounding environment.

Clause 20. The system of any clause or example herein, in particular Clause 19, wherein the body of fluid comprises a sterilant constructed to kill airborne pathogens.

Clause 21. The system of any clause or example herein, in particular any one of Clauses 19-20, wherein the body of fluid comprises water, an alcohol, or any combination thereof.

Clause 22. The system of any clause or example herein, in particular any one of Clauses 19-21, wherein the body of fluid comprises a perfume, fragrance, essential oil, or any combination thereof.

Clause 23. The system of any clause or example herein, in particular any one of Clauses 19-22, wherein the first and second portions are respective end portions of the piece of at least partially-delignified plant material separated from each other along an extension direction that is substantially parallel to a longitudinal growth direction of an original natural plant material.

Clause 24. A method comprising:
providing the evaporative device of any clause or example herein, in particular any one of Clauses 1-18 in fluid communication with a body of fluid; and
evaporating fluid from the body of fluid using the evaporative device.

Clause 25. The method of any clause or example herein, in particular Clause 24, wherein the providing comprises disposing a first portion of the evaporative device within the body of fluid and a second portion of the evaporative device outside of the body of fluid.

Clause 26. The method of any clause or example herein, in particular any one of Clauses 24-25, wherein the first and second portions are respective end portions of the piece of at least partially-delignified plant material separated from each other along an extension direction that is substantially parallel to a longitudinal growth direction of an original natural plant material.

Clause 27. The method of any clause or example herein, in particular any one of Clauses 24-26, wherein the body of fluid comprises a sterilant constructed to kill airborne pathogens.

Clause 28. The method of any clause or example herein, in particular any one of Clauses 24-27, wherein the body of fluid comprises water, an alcohol (e.g., ethanol, methanol, isopropanol, etc.), or any combination thereof.

Clause 29. The method of any clause or example herein, in particular any one of Clauses 24-28, wherein the body of fluid comprises a perfume, fragrance, essential oil, or any combination thereof.

Clause 30. A method comprising:
(a) producing a piece of at least partially-delignified plant material by subjecting a piece of natural plant material to one or more chemical treatments so as to remove at least some lignin therefrom;
(b) rinsing the piece of at least partially-delignified plant material with a rinsing solution; and
(c) drying the piece of at least partially-delignified plant material,
wherein, after (a), the piece of at least partially-delignified plant material has a modified microstructure comprising:
a plurality of vessels, each vessel defining a first lumen having a maximum cross-sectional dimension of at least 100 μm (e.g., 200-400 μm, inclusive);
a plurality of fibers, each fiber defining a second lumen having a maximum cross-sectional dimension less than or equal to 20 μm (e.g., 10±5 μm, inclusive); and a plurality of engineered micropores that extend through walls of the vessels or fibers so as to fluidically interconnect the first and second lumina.

Clause 31. The method of any clause or example herein, in particular Clause 30, wherein at least one of the one or more chemical treatments of (a) comprises partial or full immersion in one or more chemical solutions.

Clause 32. The method of any clause or example herein, in particular any one of Clauses 30-31, wherein the one or more chemical solutions comprise an alkaline solution.

Clause 33. The method of any clause or example herein, in particular any one of Clauses 30-32, wherein the one or more chemical solutions comprise sodium hydroxide (NaOH), lithium hydroxide (LiOH), potassium hydroxide (KOH), sodium sulfite ($Na_2SO_3$), sodium sulfide ($Na_2S$), $Na_nS$ wherein n is an integer, urea ($CH_4N_2O$), sodium bisulfite ($NaHSO_3$), sulfur dioxide ($SO_2$), anthraquinone ($C_{14}H_8O_2$), methanol ($CH_3OH$), ethanol ($C_2H_5OH$), butanol ($C_4H_9OH$), formic acid ($CH_2O_2$), hydrogen peroxide ($H_2O_2$), acetic acid ($CH_3COOH$), butyric acid ($C_4H_8O_2$), peroxyformic acid ($CH_2O_3$), peroxyacetic acid ($C_2H_4O_3$), ammonia ($NH_3$), tosylic acid (p-TsOH), sodium hypochlorite (NaClO), sodium chlorite ($NaClO_2$), chlorine dioxide ($ClO_2$), chorine ($Cl_2$), or any combination of the above.

Clause 34. The method of any clause or example herein, in particular any one of Clauses 30-33, wherein the one or more chemical solutions comprise a boiling solution of NaOH and $Na_2SO_3$.

Clause 35. The method of any clause or example herein, in particular any one of Clauses 30-34, wherein the one or more chemical solutions comprise a boiling solution of $H_2O_2$.

Clause 36. The method of any clause or example herein, in particular Clause 35, wherein the boiling solution of $H_2O_2$ is subsequent to a boiling solution of NaOH and $Na_2SO_3$.

Clause 37. The method of any clause or example herein, in particular any one of Clauses 30-36, wherein the vessels and the fibers extend along an extension direction that is substantially parallel to a longitudinal growth direction of an original natural plant material, and the engineered micropores extend along a direction that is perpendicular to, or at least crosses, the extension direction.

Clause 38. The method of any clause or example herein, in particular any one of Clauses 30-37, wherein the engineered micropores have a maximum cross-sectional dimension less than or equal to 2 μm (e.g., with at least one, some, or all having cross-sectional dimension less than or equal to 100 nm).

Clause 39. The method of any clause or example herein, in particular any one of Clauses 30-38, wherein the plant material is reed or bamboo.

Clause 40. The method of any clause or example herein, in particular any one of Clauses 30-39, wherein an amount of lignin in the piece of at least partially-delignified plant material after (a) is at least 10% less than an amount of lignin in the piece of natural plant material prior to (a).

Clause 41. The method of any clause or example herein, in particular any one of Clauses 30-40, wherein the amount of lignin in the piece of at least partially-delignified plant material after (a) is at least 50% less than the amount of lignin in the piece of natural plant material prior to (a).

Clause 42. The method of any clause or example herein, in particular any one of Clauses 30-41, wherein the amount of lignin in the piece of at least partially-delignified plant material after (a) is at least 90% less than the amount of lignin in the piece of natural plant material prior to (a).

Clause 43. The method of any clause or example herein, in particular any one of Clauses 30-42, wherein the natural plant material is reed and a lignin content in the piece of at least partially-delignified plant material after (a) is less than or equal to 11 wt %, or the natural plant material is bamboo and a lignin content in the piece of at least partially-delignified plant material after (a) is less than or equal to 18 wt %.

Clause 44. The method of any clause or example herein, in particular any one of Clauses 30-43, wherein, after (a):
a lignin content in the piece of at least partially-delignified plant material is less than or equal to 5 wt % (e.g., less than or equal to 2 wt %);
a hemicellulose content in the piece of at least partially-delignified plant material is less than or equal to 15 wt %;
a cellulose content in the piece of at least partially-delignified plant material is at least 50 wt %; or
any combination of the above.

Clause 45. The method of any clause or example herein, in particular any one of Clauses 30-44, wherein an amount of hemicellulose in the piece of at least partially-delignified plant material after (a) is at least 10% less than an amount of hemicellulose in the piece of natural plant material prior to (a).

Clause 46. The method of any clause or example herein, in particular any one of Clauses 30-45, wherein the amount of hemicellulose in the piece of at least partially-delignified plant material after (a) is at least 25% less than the amount of hemicellulose in the piece of natural plant material prior to (a).

Clause 47. The method of any clause or example herein, in particular any one of Clauses 30-46, wherein:
the maximum cross-sectional dimensions of the vessels in the modified microstructure after (a) are greater than maximum cross-sectional dimensions of corresponding vessels in a microstructure of the piece of natural plant material prior to (a);
the maximum cross-sectional dimensions of the fibers in the modified microstructure after (a) are greater than maximum cross-sectional dimensions of corresponding fibers in a microstructure of the piece of natural plant material prior to (a); or
any combination thereof.

Clause 48. The method of any clause or example herein, in particular any one of Clauses 30-47, wherein, prior to (a), the piece of natural plant material lacks the engineered micropores.

Clause 49. The method of any clause or example herein, in particular any one of Clauses 30-48, wherein a density of the piece of at least partially-delignified plant material after (c) is less than a density of the piece of natural plant material prior to (a).

Clause 50. The method of any clause or example herein, in particular any one of Clauses 30-49, wherein a density of the piece of at least partially-delignified plant material after (c) is less than 0.5 g/cm³ (e.g., less than or equal to 0.3 g/cm³).

Clause 51. The method of any clause or example herein, in particular any one of Clauses 30-50, wherein a porosity of the piece of at least partially-delignified plant material after (a) is greater than a porosity of the piece of natural plant material prior to (a).

Clause 52. The method of any clause or example herein, in particular any one of Clauses 30-51, wherein a porosity of the piece of at least partially-delignified plant material is at least 75%.

Clause 53. The method of any clause or example herein, in particular any one of Clauses 30-52, wherein a surface area of the piece of at least partially-delignified plant material after (a) is at least 2 times greater than a surface area of the piece of natural plant material prior to (a).

Clause 54. The method of any clause or example herein, in particular any one of Clauses 30-53, wherein a surface area of the piece of at least partially-delignified plant material after (a) is at least 5 cm²/g (e.g., at least 7.5 cm²/g).

Clause 55. The method of any clause or example herein, in particular any one of Clauses 30-54, wherein a water retention value of the piece of at least partially-delignified plant material after (a) is greater than a water retention value of the piece of natural plant material prior to (a).

Clause 56. The method of any clause or example herein, in particular any one of Clauses 30-55, wherein a water retention value of the piece of at least partially-delignified plant material after (a) is at least 1.5 g/g (e.g., at least 2 g/g).

Clause 57. The method of any clause or example herein, in particular any one of Clauses 30-56, wherein an initial water contact angle of the piece of at least partially-delignified plant material after (a) is greater than an initial water contact angle of the piece of natural plant material prior to (a).

Clause 58. The method of any clause or example herein, in particular any one of Clauses 30-57, wherein an initial water contact angle of the piece of at least partially-delignified plant material after (a) is less than or equal to 10° on a cross-sectional surface thereof.

Clause 59. The method of any clause or example herein, in particular any one of Clauses 30-58, further comprising providing an anti-bacterial or anti-viral coating on surfaces of the at least partially-delignified plant material.

Clause 60. The method of any clause or example herein, in particular Clause 59, wherein the coating comprises a $Cu^{2+}$ salt formed using a $CuCl_2$ solution, Ag nanoparticles, Ag nanowires, or any combination of the foregoing.

Clause 61. An evaporative device formed by the method of any clause or example herein, in particular any one of Clauses 30-60.

CONCLUSION

Any of the features illustrated or described with respect to FIGS. 1-13B and Clauses 1-61 can be combined with any other features illustrated or described with respect to FIGS. 1-13B and Clauses 1-61 to provide materials, systems, methods, devices, and embodiments not otherwise illustrated or specifically described herein. All features described herein are independent of one another and, except where structurally impossible, can be used in combination with any other feature described herein.

In view of the many possible embodiments to which the principles of the disclosed technology may be applied, it should be recognized that the illustrated embodiments are only preferred examples and should not be taken as limiting the scope of the disclosed technology. Rather, the scope is defined by the following claims. We therefore claim all that comes within the scope and spirit of these claims.

The invention claimed is:

1. A method comprising:
    providing an evaporative device in fluid communication with a body of fluid, the evaporative device comprising
        a piece of at least partially-delignified plant material having a modified microstructure comprising:
            a plurality of vessels, each vessel defining a first lumen having a maximum cross-sectional dimension of at least 100 µm;
            a plurality of fibers, each fiber defining a second lumen having a maximum cross-sectional dimension less than or equal to 20 µm; and
            a plurality of engineered micropores that extend through walls of the vessels or fibers so as to fluidically interconnect the first and second lumina; and
    evaporating fluid from the body of fluid using the evaporative device.

2. The method of claim 1, wherein the providing comprises disposing a first portion of the evaporative device within the body of fluid and a second portion of the evaporative device outside of the body of fluid.

3. The method of claim 2, wherein the first and second portions are respective end portions of the piece of at least partially-delignified plant material separated from each other along an extension direction that is substantially parallel to a longitudinal growth direction of an original natural plant material.

4. The method of claim 1, wherein the body of fluid comprises a sterilant constructed to kill airborne pathogens.

5. The method of claim 1, wherein the body of fluid comprises water, an alcohol, or any combination thereof.

6. The method of claim 1, wherein the body of fluid comprises a perfume, fragrance, essential oil, or any combination thereof.

7. The method of claim 1, wherein the vessels and the fibers extend along an extension direction that is substantially parallel to a longitudinal growth direction of an original natural plant material, and the engineered micropores extend along a direction that is perpendicular to, or at least crosses, the extension direction.

8. The method of claim 1, wherein the engineered micropores have a maximum cross-sectional dimension less than or equal to 2 µm.

9. The method of claim 1, wherein the plant material is reed or bamboo.

10. The method of claim 9, wherein the plant material is reed and a lignin content in the piece of at least partially-delignified plant material is less than or equal to 11 wt %.

11. The method of claim 9, wherein the plant material is bamboo and a lignin content in the piece of at least partially-delignified plant material is less than or equal to 18 wt %.

12. The method of claim 1, wherein the modified microstructure is constructed such that longitudinal transport of fluid through the piece primarily occurs via the second lumina and evaporation of fluid primarily occurs via the first lumina.

13. The method of claim 1, wherein a porosity of the piece of at least partially-delignified plant material is at least 75%.

14. The method of claim 1, wherein the piece of at least partially-delignified plant material is constructed to provide a water retention value of at least 1.5 g/g.

15. The method of claim 1, further comprising, prior to the providing:
 (a) producing a piece of at least partially-delignified plant material by subjecting a piece of natural plant material to one or more chemical treatments so as to remove at least some lignin therefrom;
 (b) rinsing the piece of at least partially-delignified plant material with a rinsing solution; and
 (c) drying the piece of at least partially-delignified plant material, thereby forming the evaporative device.

16. The method of claim 15, wherein at least one of the one or more chemical treatments of (a) comprises partial or full immersion in one or more chemicals.

17. The method of claim 16, wherein the one or more chemicals comprises sodium hydroxide (NaOH), lithium hydroxide (LiOH), potassium hydroxide (KOH), sodium sulfite ($Na_2SO_3$), sodium sulfide ($Na_2S$), $Na_nS$ wherein n is an integer, urea ($CH_4N_2O$), sodium bisulfite ($NaHSO_3$), sulfur dioxide ($SO_2$), anthraquinone ($C_{14}H_8O_2$), methanol ($CH_3OH$), ethanol ($C_2H_5OH$), butanol ($C_4H_9OH$), formic acid ($CH_2O_2$), hydrogen peroxide ($H_2O_2$), acetic acid ($CH_3COOH$), butyric acid ($C_4H_8O_2$), peroxyformic acid ($CH_2O_3$), peroxyacetic acid ($C_2H_4O_3$), ammonia ($NH_3$), tosylic acid (p-TsOH), sodium hypochlorite (NaClO), sodium chlorite ($NaClO_2$), chlorine dioxide ($ClO_2$), chorine ($Cl_2$), or any combination of the above.

18. The method of claim 16, wherein the one or more chemical treatments of (a) comprises treatment with a first solution of NaOH and $Na_2SO_3$ followed by treatment with a second solution of $H_2O_2$.

19. The method of claim 15, wherein, after (a):
 a lignin content in the piece of at least partially-delignified plant material is less than or equal to 5 wt %;
 a hemicellulose content in the piece of at least partially-delignified plant material is less than or equal to 15 wt %;
 a cellulose content in the piece of at least partially-delignified plant material is at least 50 wt %; or
 any combination of the above.

20. The method of claim 15, wherein:
 a density of the piece of at least partially-delignified plant material after (c) is less than 0.5 g/cm$^3$; or
 a surface area of the piece of at least partially-delignified plant material after (a) is at least 5 cm$^2$/g.

* * * * *